United States Patent
Zhang

(10) Patent No.: US 8,564,973 B2
(45) Date of Patent: Oct. 22, 2013

(54) INVERTER TOPOLOGY CIRCUIT, INVERSION METHOD AND INVERTER

(71) Applicant: Huawei Technologies Co., Ltd., Shenzhen (CN)

(72) Inventor: Yanzhong Zhang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/706,087

(22) Filed: Dec. 5, 2012

(65) Prior Publication Data

US 2013/0114321 A1 May 9, 2013

Related U.S. Application Data

(63) Continuation of application No. PCT/CN2012/075812, filed on May 21, 2012.

(30) Foreign Application Priority Data

Oct. 17, 2011 (CN) .......................... 2011 1 0314760

(51) Int. Cl.
*H02M 3/335* (2006.01)

(52) U.S. Cl.
USPC ................................. 363/17; 363/37; 307/64

(58) Field of Classification Search
USPC ............. 363/16–20, 25, 21.02, 21.18, 37, 40, 363/56.05, 80, 89, 97, 98, 127, 132; 323/205, 207, 222, 224, 225, 282–290; 307/23, 64–66, 77, 82, 151
See application file for complete search history.

(56) References Cited

U.S. PATENT DOCUMENTS

| | | | |
|---|---|---|---|
| 5,132,889 A * | 7/1992 | Hitchcock et al. | 363/17 |
| 5,532,919 A * | 7/1996 | Gegner | 363/124 |
| 7,046,534 B2 * | 5/2006 | Schmidt et al. | 363/132 |
| 2010/0054008 A1 | 3/2010 | Schaible et al. | |

FOREIGN PATENT DOCUMENTS

| | | |
|---|---|---|
| CN | 102158110 A | 8/2011 |
| CN | 201956925 U | 8/2011 |
| CN | 101707442 A | 5/2012 |
| CN | 102437765 A | 5/2012 |
| WO | 2011/042567 A1 | 4/2011 |

OTHER PUBLICATIONS

International Search Report issued in corresponding PCT Application No. PCT/CN2012/075812; mailed Oct. 17, 2011.
Frisch, Michael et al. "High Efficient Topologies for Next Generation Solar Inverter" Jun. 2008.

* cited by examiner

*Primary Examiner* — Rajnikant Patel
(74) *Attorney, Agent, or Firm* — Brinks Hofer Gilson & Lione

(57) ABSTRACT

An inversion method and an inverter, in which a fifth switch tube, a sixth switch tube, a fifth diode, a sixth diode, and a first capacitor are added in the existing inverter circuit including a bridge arm, the fifth switch tube is connected in parallel to the fifth diode, and the sixth switch tube is connected in parallel to the sixth diode; wherein the positive pole of the fifth diode is connected to the negative pole of a direct current source, the negative pole of the fifth diode is connected to a connection circuit between a second inductor and an alternating current source, the positive pole of the sixth diode is connected to the negative pole of the direct current source, and the negative pole of the sixth diode is connected to a connection circuit between a first inductor and the alternating current source.

13 Claims, 13 Drawing Sheets

The inductor current is a small negative value

Critical mode of the inductor current

INVERTER TOPOLOGY CIRCUIT, INVERSION METHOD AND INVERTER

CROSS-REFERENCE TO RELATED APPLICATIONS

This application is a continuation of International Application No. PCT/CN2012/075812, filed on May 21, 2012, which claims priority to Chinese Patent Application No. 201110314760.6, filed on Oct. 17, 2011, both of which are hereby incorporated by reference in their entireties.

FIELD

The present application relates to the communications field, and in particular, to an inverter topology circuit, an inversion method, and an inverter.

BACKGROUND

An inverter circuit is a circuit converting a direct current to an alternating current and converting direct current energy to alternating current energy. The inverter circuit includes a form of outputting an alternating current voltage, for example, an uninterrupted power supply; and further includes a form of supplying an alternating current output current following an external alternating current voltage, for example, a solar grid-connected inverter or a wind grid-connected power generator.

During working of the inverter circuit, the high-frequency switch in the circuit needs to be switched between the turn-on state and the turn-off state at a high frequency. However, in the prior art, when high-frequency switching is performed between turn-on and turn-off for the switch, turn-on and turn-off loss may be caused. Therefore, power consumption of the circuit is great and the efficiency is low.

SUMMARY

Embodiments of the present application provide an inverter topology circuit, capable of mitigating turn-on loss and turn-off loss of a high-frequency switch, reducing the power consumption, and improving working efficiency.

To meet the preceding purposes, embodiments of the present application adopt the following solutions:

In one aspect, an inverter topology circuit is provided, including a direct current source, an alternating current source, a first bridge arm, a first inductor, and a second inductor, where the first bridge arm is connected in parallel to two poles of the direct current source, one ends of the first and second inductors are connected to connection points of two branches of the first bridge arm, respectively, and the other ends of the first and second inductors are connected to two poles of the alternating current source, respectively; the circuit further includes: a fifth switch tube, a sixth switch tube, a fifth diode, a sixth diode, and a first capacitor. The fifth switch tube is connected in parallel to the fifth diode, and the sixth switch tube is connected in parallel to the sixth diode. The same poles of the fifth and sixth diodes are connected to one pole of the direct current source. The other pole of the fifth diode is connected to a connection point between the second inductor and the alternating current source, and the other end of the sixth diode is connected to a connection point between the first inductor and the alternating current source. The first capacitor is connected in parallel to two poles of the alternating current source.

In another aspect, an inversion method for an inverter circuit is provided, including: within a first half cycle, maintaining a fifth switch tube connected, and maintaining third, fourth and sixth switch tubes turned off; turning on a first switch tube, and turning off a second switch tube, to increase a current of a first inductor, and output power to an alternating current source; turning off the first switch tube, to start a freewheeling current by the first inductor, turning on the second switch tube, to start the decreasing of the current of the first inductor; when the current of the first inductor decreases to zero or a small negative value, turning off the second switch tube and turning on the first switch tube; within a second half cycle, maintaining the sixth switch tube connected, and maintaining the first, second and sixth switch tubes turned off; turning on the third switch tube, turning off the fourth switch tube, to increase a current of a second inductor and output power to the alternating current source; turning off the third switch tube, to start a freewheeling current by the second inductor, and turning on the fourth switch tube, to start the decreasing of the current of the second inductor; and when the current of the second inductor decreases to zero or a small negative value, turning off the fourth switch tube and turning on the third switch tube.

In still another aspect, an inversion method is provided, including: in a first time period when an output voltage is reverse to an output current, maintaining first, second, third and fifth switch tubes turned off; turning on fourth and sixth switch tubes; maintaining the sixth switch tube connected, and adjusting the turned-on time of the fourth switch tube to obtain a desired output current; in a second time period when the output voltage is reverse to the output current, maintaining the first, third, fourth and sixth switch tubes turned off; turning on the second and fifth switch tubes; and maintaining the fifth switch tube connected, and adjusting turned-on time of the second switch tube to obtain a desired output current.

In still another aspect, an inversion method is provided, including: when first and fifth switch tubes are turned on or turned off concurrently, starting a freewheeling current by a second switch tube, a second diode and a seventh diode concurrently; when third and sixth switch tubes are turned on or turned off concurrently, starting a freewheeling current by a fourth switch tube, a fourth diode and a eighth diode, where a working mode of this circuit may be an inductance continuous mode; and controlling an inductive current to zero or a negative value, exercising the function of a freewheeling current by the seventh and eight diodes.

In still another aspect, an inversion method is provided, including: when an output voltage is less than a voltage of a direct current source, working in boost mode by a circuit; turning on a first switch tube, to increase an inductive current by a first inductor; turning off the first switch tube, and turning on a second switch tube, to start a freewheeling current by the first inductor; when a voltage of an alternating current source is greater than the voltage of the direct current source, working in buck mode by the circuit; maintaining the first switch tube connected, turning on a sixth switch tube, turning off a fifth switch tube, to increase the inductive current by the first inductor; and turning off the sixth switch tube after the current increases, and turning on the fifth switch tube, to start a freewheeling current by the first inductor.

In still another aspect, an inverter is provided, including: the inverter topology circuit; a control logic, connected to each switch tube in the inverter topology circuit and configured to control turn-on or turn-off of the switch tubes in the inverter circuit; and a filter circuit, connected to a voltage output end of the inverter topology circuit and configured to filter out interference in an output alternating current voltage.

BRIEF DESCRIPTION OF THE DRAWINGS

To illustrate the solutions according to the embodiments of the present application or in the prior art more clearly, the accompanying drawings required for describing the embodiments or the prior art are introduced in the following briefly. Apparently, the accompanying drawings in the following descriptions merely show some of the embodiments of the present application, and persons of ordinary skill in the art can obtain other drawings according to the accompanying drawings without creative efforts.

DETAILED DESCRIPTION OF THE EMBODIMENTS

The solutions of the present application are elaborated below with reference to accompanying drawings. Apparently, the embodiments described below are only some rather than all embodiments of the present application. All other embodiments derived by persons skilled in the art without creative work based on the embodiments of the present application should fall within the protection scope of the present application.

Figure 1:
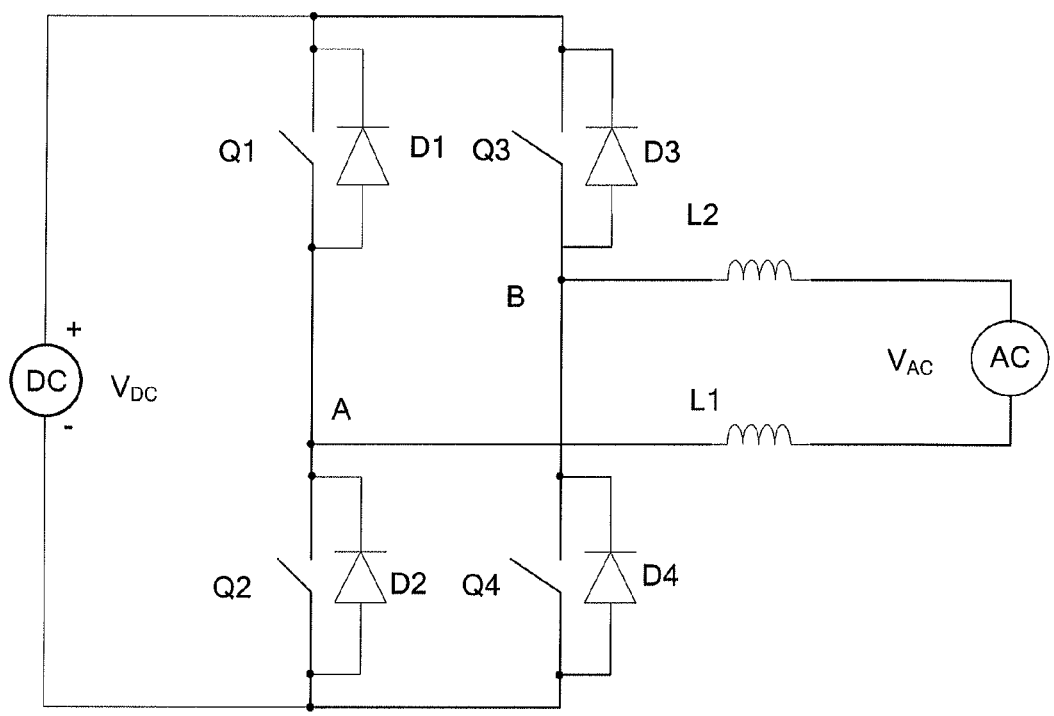
FIG. 1 is a circuit diagram of an inverter in the prior art.

FIG. 1 shows an inverter circuit in the prior art, including a direct current source DC, an alternating current source AC, high-frequency switch tubes (Q1, Q2, Q3 and Q4), filter inductors L1 and L2, and auxiliary conducting diodes (D1, D2, D3 and D4).

The working principles of the inverter circuit are illustrated in FIG. 1. Within a half cycle where Q1 is turned on, high-frequency turn-on and turn-off are performed for Q4 under the action of a control voltage or a control current. When Q4 is turned on, a current flows from the positive pole of the direct current source, travels through Q1, L1, the alternating current source, L2 and Q4, and finally returns to the negative pole of the direct current source; and in this case, the voltage output by the inverter circuit, that is, the voltage UAB between point A and point B, is the voltage of the direct current source UDC. When Q4 is turned off, because of the freewheeling current function of the inductors L1 and L2, the current flows from L1 and travels through the alternating current source, L2, Q3 (D3), Q1 and L1; and in this case, the voltage UAB output by the inverter circuit is 0. In this way, the voltage UAB within the half cycle where Q1 is turned on is equivalent to a half-sine wave in area by implementing high-frequency conversion of the voltage UAB between UDC and 0 and by controlling the turn-on and turn-off time of Q4 by using the control voltage or the control current. High-frequency voltage pulses of UAB experience the filter function of L1 and L2, and are in the same phase as the half-sine wave of the alternating current source, thereby implementing voltage following. Power output may be implemented by controlling an output current Io.

Within a work cycle of a working frequency, Q1 and Q3 each are connected for a half power frequency cycle. The working condition within the half cycle where Q3 is turned on is the same as that described above, which is not detailed here again.

In the process of turning off Q4 as shown in FIG. 1, the current Io flowing through Q4 decreases from a specific value to 0, whereas the voltage increases from 0 to UDC. The two processes have time overlay, thereby causing turn-off loss. In the process of turning on Q4, the voltage between the two ends of Q4 decreases from UDC to 0, whereas the current increases from 0 to Io. The two processes have time overlay, thereby causing turn-on loss. Therefore, Q4 is a hard switch.

The analysis for Q2 is similar to that described above, and Q2 is also called a hard switch. Such hard switch in the existing inverter circuit has great power consumption and a low efficiency.

Figure 2:
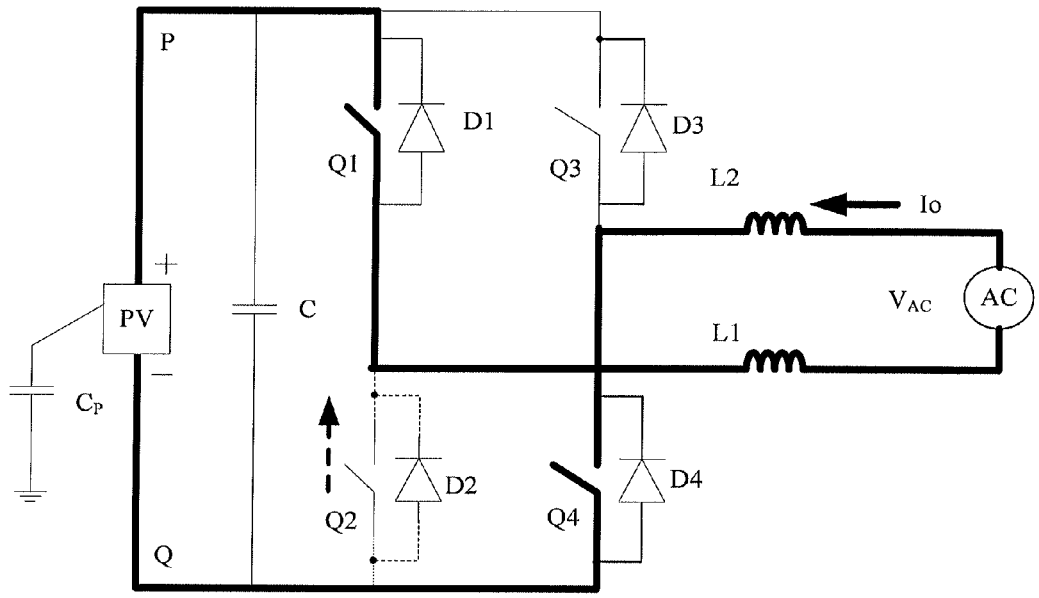
FIG. 2 is a circuit diagram of a solar grid-connected non-isolated inverter in the prior art.

FIG. 2 shows a solar non-isolated photovoltaic inverter circuit in the prior art. A direct current source is a solar photovoltaic panel. The area of the panel is large and causes a large parasitic capacitor CP between the panel and the ground, resulting in an electrical loop formed by the alternating current source, the inverter circuit and the panel parasitic capacitor. The earth leakage current flowing through the loop is positively proportional to the change rate of the voltage of the panel to the ground. In the process of turning on Q1, when Q4 is turned on, a voltage from the positive pole P point of the panel to the ground is (VDC+VAC)/2; when Q4 is turned off, the voltage is VAC/2. The change rate of the voltage within the cycle where Q4 is turned on or turned off is great. Therefore, a great leakage current is produced, which threatens personal safety, and causes the inverter not to work properly.

Embodiment 1

Figure 3A:
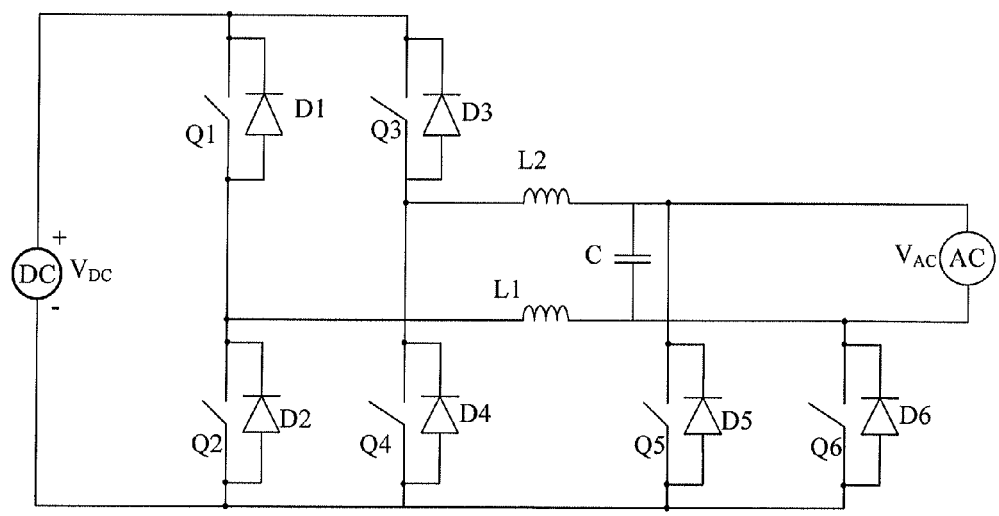
FIG. 3A is a first schematic diagram of an inverter topology circuit according to an embodiment of the present application.

An embodiment of the present application provides an inverter topology circuit. As shown in FIG. 3A, the circuit includes a direct current source DC, an alternating current source AC, high-frequency switch tubes Q1, Q2, Q3 and Q4, power frequency switch tubes Q5 and Q6, high-frequency filter inductors L1 and L2, auxiliary conducting diodes D1, D2, D3, D4, D5 and D6, and a filter capacitor C.

Specifically, Q1 is connected in parallel to D1, Q2 is connected in parallel to D2, Q3 is connected in parallel to D3, and Q4 is connected in parallel to D4. D1 is serially connected to D2 to form a first branch of a first bridge arm, D3 is serially connected to D4 to form a second branch of the first bridge arm, and the two branches are both connected in parallel to two poles of the direct current source. The negative poles of D1 and D3 are connected to the positive pole of the DC, and the positive poles of D2 and D4 are connected to the negative pole of the DC.

One end of L1 is connected to a connection point between D1 and D2, and the other end of L1 is connected to one pole of the AC. One end of L2 is connected to a connection point between D3 and D4, and the other end of L2 is connected to the other pole of the AC. The capacitor C is connected in parallel to two poles of the AC.

Q5 is connected in parallel to D5, and Q6 is connected in parallel to D6. The positive pole of D5 is connected to the negative pole of the DC, and the negative pole of D5 is connected to a connection point between the second inductor and the alternating current source. The positive pole of D6 is connected to the negative pole of the DC, and the negative pole of D6 is connected to a connection point between the first inductor and the alternating current source.

The direct current source may be an apparatus supplying a direct current, for example, a fuel cell, a Ni-MH battery, an iron battery, a lead acid battery, a solar panel. The switch tube may be a metal-oxide-semiconductor field-effect transistor (MOSFET), an insulated gate bipolar transistor (IGBT), a triode, a thyristor, or the like. The diode may be a Schottky diode, a fast recovery diode, a silicon tube, carborundum, or a plurality of serially connected diodes. The switch tube and the diode that is connected in reversely parallel to the switch tube may be independent elements, or an integrated element, or a parasitic diode of the switch tube. The alternating current source may be an isolated transformer. An output waveform may be a square wave, a sine wave, a triangle wave, a sawtooth wave, or the like.

The inverter topology circuit provided in this embodiment of the present application is capable of implementing soft switching of a high-frequency switch, thereby effectively reducing turn-on and turn-off loss of a high-frequency switch, and improving working efficiency.

Embodiment 2

Figure 3B:
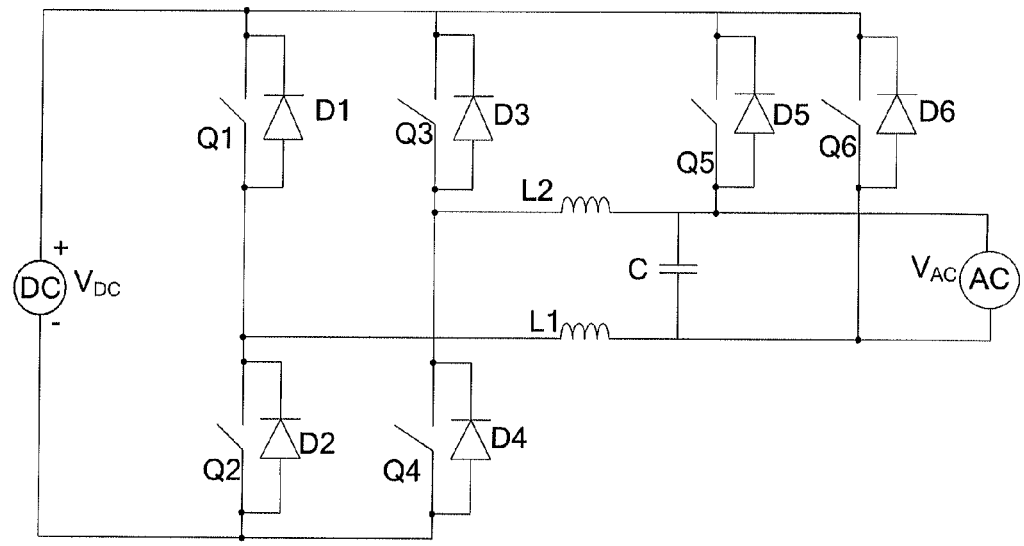
FIG. 3B is a second schematic diagram of an inverter topology circuit according to an embodiment of the present application.

An embodiment of the present application provides an inverter topology circuit. As shown in FIG. 3B, the circuit includes a direct current source DC, an alternating current source AC, high-frequency switch tubes Q1, Q2, Q3 and Q4, power frequency switch tubes Q5 and Q6, high-frequency filter inductors L1 and L2, auxiliary conducting diodes D1, D2, D3, D4, D5 and D6, and a filter capacitor C.

In this embodiment, the negative poles of only D5 and D6 are connected to the positive pole of the direct current source, the positive pole of D5 is connected to a connection point between the second inductor and the alternating current source, the positive pole of D6 is connected to a connection point between the first inductor and the alternating current source. Other parts are the same as those in Embodiment 1, and are not detailed here again.

The direct current source may be an apparatus supplying direct current, for example, a fuel cell, a Ni-MH battery, an iron battery, a lead acid battery, a solar panel. The switch tube may be a MOSFET, an IGBT, a triode, a thyristor, or the like. The diode may be a Schottky diode, a fast recovery diode, a silicon tube, carborundum, or a plurality of serially connected diodes. The switch tube and the diode that is connected in reversely parallel to the switch tube may be independent elements, or an integrated element, or the switch tube and its parasitic diode of the switch tube. The alternating current source may be an isolated transformer. An output waveform may be a square wave, a sine wave, a triangle wave, a sawtooth wave, or the like.

The inverter topology circuit provided in this embodiment is capable of implementing soft switching of a high-frequency switch, thereby effectively reducing turn-on and turn-off loss of a high-frequency switch, and improving working efficiency.

Embodiment 3

Figure 4A:
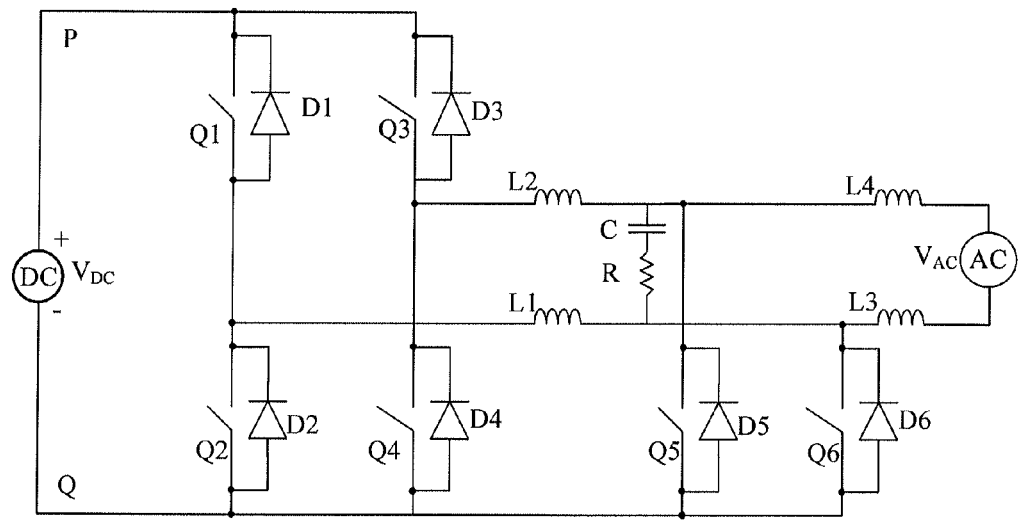
FIG. 4A is a fifth schematic diagram of an inverter topology circuit according to an embodiment of the present application.

An embodiment of the present application provides an inverter topology circuit. As shown in FIG. 4A, the circuit includes a direct current source DC, an alternating current source AC, high-frequency switch tubes Q1, Q2, Q3 and Q4, power frequency switch tubes Q5 and Q6, high-frequency filter inductors L1 and L2, power frequency inductors L3 and L4, a resonance-suppressing resistor R, auxiliary conducting diodes D1, D2, D3, D4, D5 and D6, and a filter capacitor C.

Specifically, Q1 is connected in parallel to D1, Q2 is connected in parallel to D2, Q3 is connected in parallel to D3, and Q4 is connected in parallel to D4. D1 is serially connected to D2 to form a first branch of a first bridge arm, D3 is serially connected to D4 to form a second branch of the first bridge arm, and the two branches are both connected in parallel to two poles of the direct current source. The negative poles of D1 and D3 are connected to the positive pole of the DC, and the positive poles of D2 and D4 are connected to the negative pole of the DC.

One end of L1 is connected to a connection point between D1 and D2, and the other end of L1 is connected to one pole of the AC. One end of L2 is connected to a connection point between D3 and D4, and the other end of L2 is connected to the other pole of the AC. One end of the capacitor C is connected to L2 and the other end is connected to the resistor R, to form a serial circuit, where R is arranged between C and L1.

Q5 is connected in parallel to D5 and Q6 is connected in parallel to D6. The positive pole of D5 is connected to the negative pole of the DC, and the negative pole of D5 is connected to a connection point between L2 and the AC. The positive pole of D6 is connected to the negative pole of the DC, and the negative pole of D6 is connected to a connection point between L1 and the AC.

L3 is arranged in a connection circuit between L1 and the AC, one end of L3 is connected to D6 and Q6, and the other end of L3 is connected to one end of the AC. L4 is arranged in a connection circuit between L2 and the AC, one end of L4 is connected to D5 and Q5, and the other end of L4 is connected to the other end of the AC.

The direct current source may be an apparatus supplying direct current, for example, a fuel cell, a Ni-MH battery, an iron battery, a lead acid battery, a solar panel. The switch tube may be a MOSFET, an IGBT, a triode, a thyristor, or the like. The diode may be a Schottky diode, a fast recovery diode, a silicon tube, carborundum, or a plurality of serially connected diodes. The switch tube and the diode that is connected in reversely parallel to the switch tube may be independent elements, or an integrated element, or the switch tube and its parasitic diode of the switch tube. The alternating current source may be an isolated transformer. An output waveform may be a square wave, a sine wave, a triangle wave, a sawtooth wave, or the like.

By adding the filtering of the power frequency filter inductors L3 and L4 and the filter capacitor C, and the resonance suppression function of the resistor R, a better output waveform is obtained.

The inverter topology circuit may be applicable to a solar non-isolated inverter. The direct current source is equivalent to a solar panel, the alternating current source is a power grid, and one end of the alternating current source is grounded. When a high-frequency current flows through the resistor R having small resistance and the capacitor C, and the power frequency inductors L3 and L4 perform power frequency filtering, the voltage applied between R and C is almost close to the voltage of the alternating current source. Therefore, the change rate of the voltage is small, and the common-modulus leakage current caused to the ground by the positive pole of the solar panel having a large area is also small, thereby improving safety.

The inverter topology circuit may also be applied in buck Buck and boost Boost working modes, or applied to reactive power compensation.

The inverter topology circuit provided in this embodiment is capable of implementing soft switching of a high-frequency switch, thereby effectively reducing turn-on and turn-off loss of a high-frequency switch, and improving working efficiency. The inverter topology circuit is capable of compensating for reactive power, thereby satisfying the requirements of the inductive or capacitive load of the alternating current source, and improving the utilization rate of electric energy. Further, the inverter topology circuit may also be used in boost and buck modes, thereby implementing voltage input within a wide range. In addition, the leakage current caused by a solar non-isolated photovoltaic inverter circuit is prevented effectively, and safety is improved.

Embodiment 4

Figure 4B:
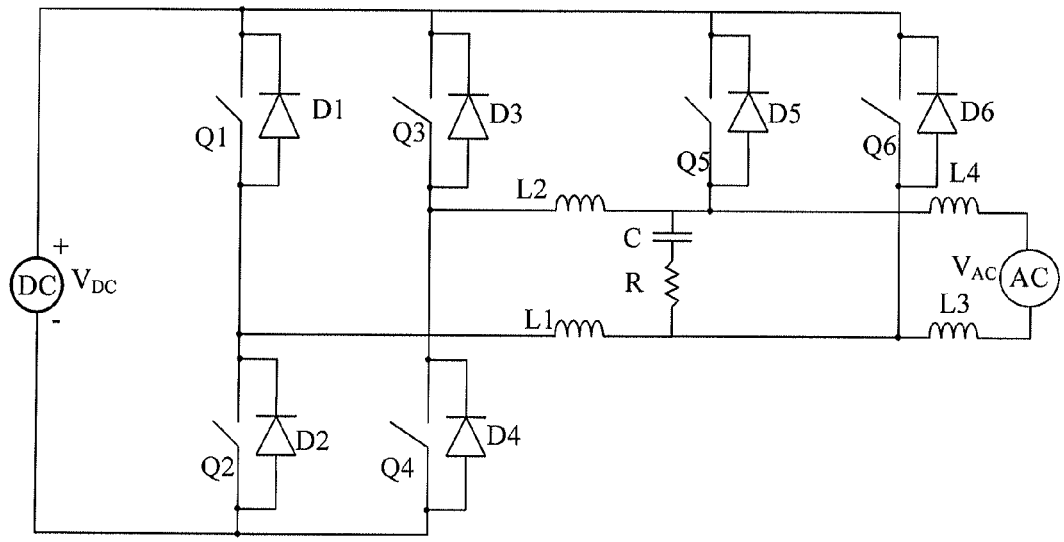
FIG. 4B is a sixth schematic diagram of an inverter topology circuit according to an embodiment of the present application.

An embodiment of the present application provides an inverter topology circuit. As shown in FIG. 4B, the circuit includes a direct current source DC, an alternating current source AC, high-frequency switch tubes Q1, Q2, Q3 and Q4, power frequency switch tubes Q5 and Q6, high-frequency filter inductors L1 and L2, power frequency inductors L3 and L4, a resonance-suppressing resistor R, auxiliary conducting diodes D1, D2, D3, D4, D5 and D6, and a filter capacitor C.

In this embodiment, the negative poles of only D5 and D6 are connected to the positive pole of the direct current source, the positive pole of D5 is connected to a connection point between the second inductor and the alternating current source, the positive pole of D6 is connected to a connection point between the first inductor and the alternating current source. Other parts are the same as those in Embodiment 3, and are not detailed here again.

The direct current source may be an apparatus supplying direct current, for example, a fuel cell, a Ni-MH battery, an iron battery, a lead acid battery, a solar panel. The switch tube may be a MOSFET, an IGBT, a triode, a thyristor, or the like. The diode may be a Schottky diode, a fast recovery diode, a silicon tube, carborundum, or a plurality of serially connected diodes. The switch tube and the diode that is connected in reversely parallel to the switch tube may be independent elements, or an integrated element, or the switch tube and its parasitic diode of the switch tube. The alternating current source may be an isolated transformer. An output waveform may be a square wave, a sine wave, a triangle wave, a sawtooth wave, or the like.

The inverter topology circuit provided in this embodiment is capable of implementing soft switching of a high-frequency switch, reducing the power consumption, and improving working efficiency. The inverter topology circuit is capable of compensating for reactive power, thereby satisfying the requirements of the inductive or capacitive load of the alternating current source, and improving the utilization rate of the electric energy. Further, the inverter topology circuit may also be used in boost and buck modes, thereby implementing voltage input within a wide range. In addition, the leakage current caused by a solar non-isolated photovoltaic inverter circuit is prevented effectively, and safety is improved.

Embodiment 5

Figure 5A:
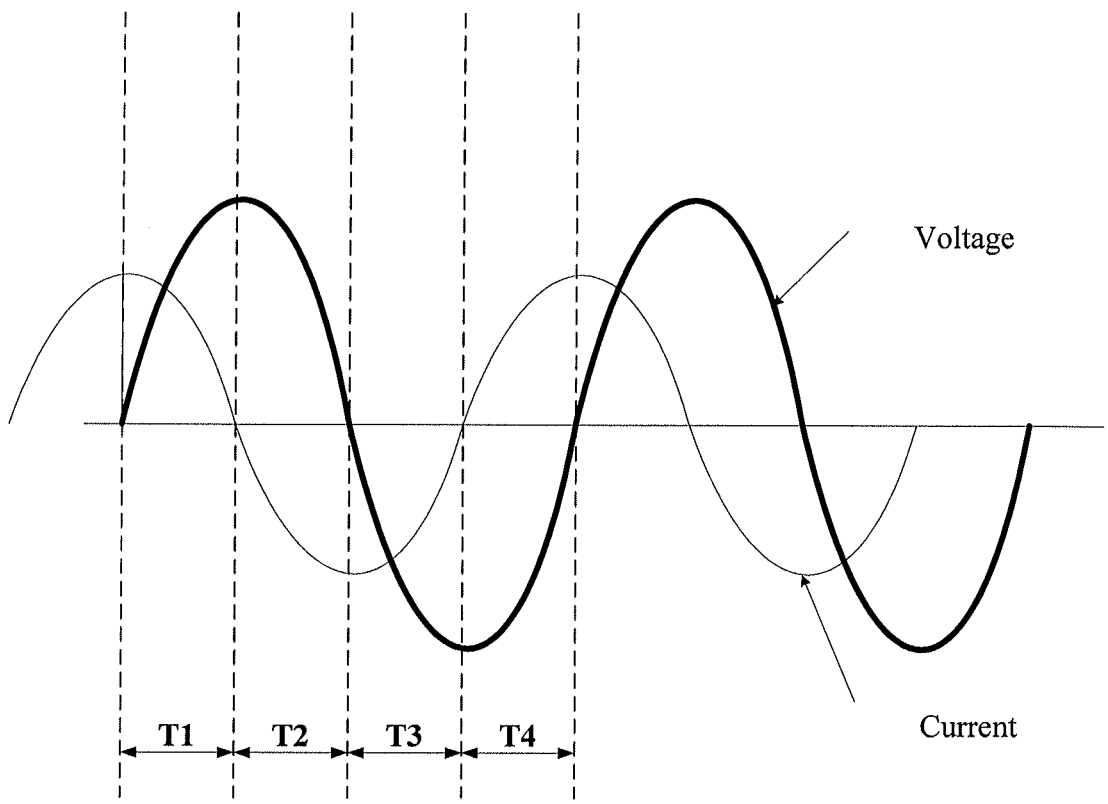
FIG. 5A is a schematic diagram of an output voltage and an output current on which an inverter topology circuit performs reactive power compensation according to an embodiment of the present application.
Figure 5B:
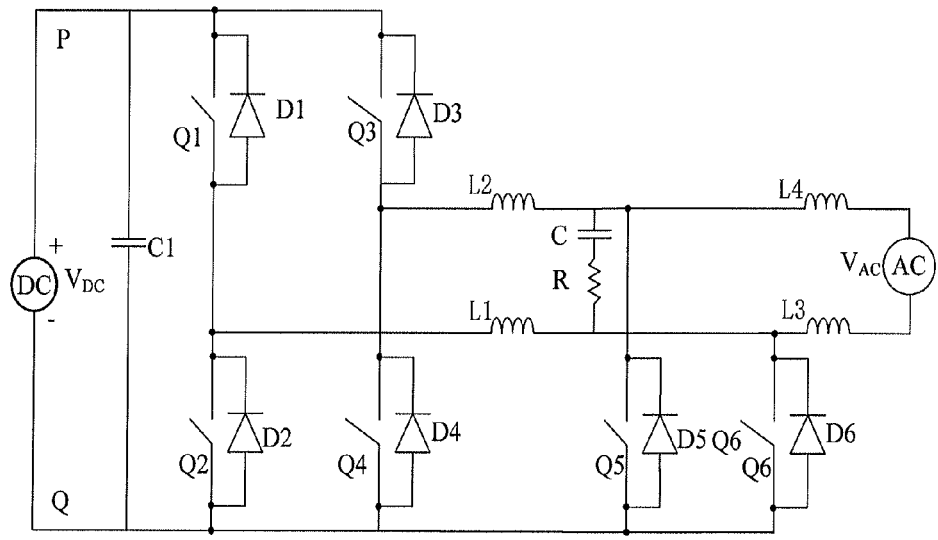
FIG. 5B is a tenth schematic diagram of an inverter topology circuit according to an embodiment of the present application.

An embodiment of the present application provides an inverter topology circuit, applicable to reactive power compensation. As shown in FIG. 5B, the circuit includes a direct current source DC, an alternating current source AC, high-frequency switch tubes Q1, Q2, Q3 and Q4, power frequency switch tubes Q5 and Q6, high-frequency filter inductors L1 and L2, power frequency inductors L3 and L4, a resonance-suppressing resistor R, auxiliary conducting diodes D1, D2, D3, D4, D5 and D6, a filter capacitor C, and a capacitor C1.

Specifically, Q1 is connected in parallel to D1, Q2 is connected in parallel to D2, Q3 is connected in parallel to D3, and Q4 is connected in parallel to D4. D1 is serially connected to D2 to form a first branch of a first bridge arm, D3 is serially connected to D4 to form a second branch of the first bridge arm, and the two branches are both connected in parallel to two poles of the direct current source. The negative poles of D1 and D3 are connected to the positive pole of the DC, and the positive poles of D2 and D4 are connected to the negative pole of the DC.

One end of L1 is connected to a connection point between D1 and D2, and the other end of L1 is connected to one pole of the AC. One end of L2 is connected to a connection point between D3 and D4, and the other end of L2 is connected to the other pole of the AC. One end of the capacitor C is connected to L2 and the other end is connected to the resistor R, to form a serial circuit, where R is arranged between C and L1.

Q5 is connected in parallel to D5 and Q6 is connected in parallel to D6. The positive pole of D5 is connected to the negative pole of the DC, and the negative pole of D5 is connected to a connection point between L2 and the AC. The positive pole of D6 is connected to the negative pole of the DC, and the negative pole of D6 is connected to a connection point between L1 and the AC.

L3 is arranged in a connection circuit between L1 and the AC, one end of L3 is connected to D6 and Q6, and the other end of L3 is connected to one end of the AC. L4 is arranged in a connection circuit between L2 and the AC, one end of L4 is connected to D5 and Q5, and the other end of L4 is connected to the other end of the AC.

The capacitor C1 is connected in parallel to the two poles of the DC.

The direct current source may be an apparatus supplying direct current, for example, a fuel cell, a Ni-MH battery, an iron battery, a lead acid battery, a solar panel. The switch tube may be a MOSFET, an IGBT, a triode, a thyristor, or the like. The diode may be a Schottky diode, a fast recovery diode, a silicon tube, carborundum, or a plurality of serially connected diodes. The switch tube and the diode that is connected in reversely parallel to the switch tube may be independent elements, or an integrated element, or the switch tube and its parasitic diode of the switch tube. The alternating current source may be an isolated transformer. An output waveform may be a square wave, a sine wave, a triangle wave, a sawtooth wave, or the like.

The inverter topology circuit may be applied to a solar non-isolated inverter, or applied in buck Buck and boost Boost working modes.

The inverter topology circuit provided in this embodiment is capable of implementing soft switching of a high-frequency switch, thereby reducing power consumption, and improving working efficiency. The inverter topology circuit is capable of compensating for reactive power, thereby satisfying the requirements of the inductive or capacitive load of the alternating current source, and improving the utilization rate of the electric energy. Further, the inverter topology circuit may also be used in boost and buck modes, thereby implementing voltage input within a wide range. In addition, the leakage current caused by a solar non-isolated photovoltaic inverter circuit is prevented effectively, and safety is improved.

Embodiment 6

Figure 6A:
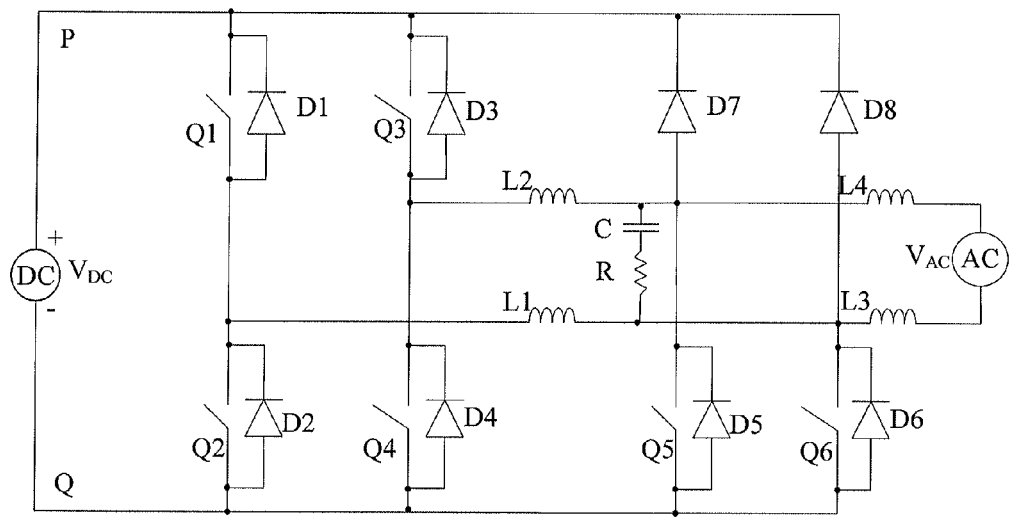
FIG. 6A is a fifteenth schematic diagram of an inverter topology circuit according to an embodiment of the present application.

An embodiment of the present application provides an inverter topology circuit. As shown in FIG. 6A, the circuit includes a direct current source DC, an alternating current source AC, high-frequency switch tubes Q1, Q2, Q3 and Q4, power frequency switch tubes Q5 and Q6, high-frequency filter inductors L1 and L2, power frequency filter inductors L3 and L4, a resonance-suppressing resistor R, auxiliary conducting diodes D1, D2, D3, D4, D5 and D6, freewheeling current diodes D7 and D8, and a filter capacitor C.

Specifically, Q1 is connected in parallel to D1, Q2 is connected in parallel to D2, Q3 is connected in parallel to D3, and Q4 is connected in parallel to D4. D1 is serially connected to D2 to form a first branch of a first bridge arm, D3 is serially connected to D4 to form a second branch of the first bridge arm, and the two branches are both connected in parallel to two poles of the direct current source. The negative poles of D1 and D3 are connected to the positive pole of the DC, and the positive poles of D2 and D4 are connected to the negative pole of the DC.

One end of L1 is connected to a connection point between D1 and D2, and the other end of L1 is connected to one pole of the AC. One end of L2 is connected to a connection point between D3 and D4, and the other end of L2 is connected to the other pole of the AC. One end of the capacitor C is connected to L2 and the other end is connected to the resistor R, to form a serial circuit, where R is arranged between C and L1.

Q5 is connected in parallel to D5 and Q6 is connected in parallel to D6. The positive pole of D5 is connected to the negative pole of the DC, and the negative pole of D5 is connected to a connection point between L2 and the AC. The positive pole of D6 is connected to the negative pole of the DC, and the negative pole of D6 is connected to a connection point between L1 and the AC.

L3 is arranged in a connection circuit between L1 and the AC, one end of L3 is connected to D6 and Q6, and the other end of L3 is connected to one end of the AC. L4 is arranged in a connection circuit between L2 and the AC, one end of L4 is connected to D5 and Q5, and the other end of L4 is connected to the other end of the AC.

The negative poles of D7 and D8 are connected to the positive pole of the DC, the positive pole of D7 is connected to the negative pole of D5, and the positive pole of D8 is connected to the negative pole of D6.

The direct current source may be an apparatus supplying direct current, for example, a fuel cell, a Ni-MH battery, an iron battery, a lead acid battery, a solar panel. The switch tube may be a MOSFET, an IGBT, a triode, a thyristor, or the like. The diode may be a Schottky diode, a fast recovery diode, a silicon tube, carborundum, or a plurality of serially connected diodes. The switch tube and the diode that is connected in reversely parallel to the switch tube may be independent elements, or an integrated element, or the switch tube and its parasitic diode of the switch tube. The alternating current source may be an isolated transformer. An output waveform may be a square wave, a sine wave, a triangle wave, a sawtooth wave, or the like.

The inverter topology circuit may be applied to a solar non-isolated inverter, or applied in buck Buck and boost Boost working modes.

The inverter topology circuit provided in this embodiment is capable of implementing soft switching of a high-frequency switch, thereby reducing power consumption, and improving working efficiency. The inverter topology circuit is capable of compensating for reactive power, thereby satisfying the requirements of the inductive or capacitive load of the alternating current source, and improving the utilization rate of the electric energy. Further, the inverter topology circuit may also be used in boost and buck modes, thereby implementing voltage input within a wide range. In addition, the leakage current caused by a solar non-isolated photovoltaic inverter circuit is prevented effectively, and safety is improved.

Embodiment 7

Figure 6B:
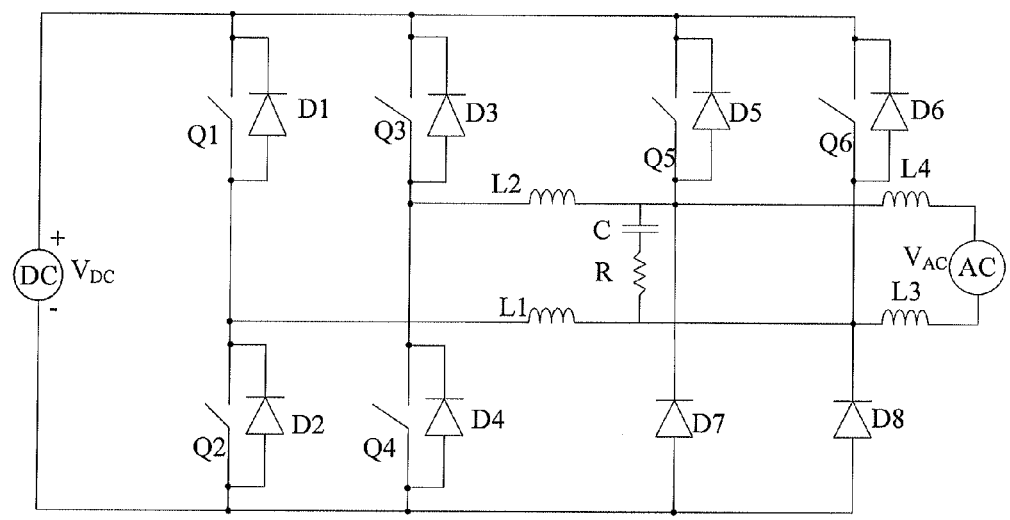
FIG. 6B is a sixteenth schematic diagram of an inverter topology circuit according to an embodiment of the present application.

An embodiment of the present application provides an inverter topology circuit. As shown in FIG. 6B, the circuit includes a direct current source DC, an alternating current source AC, high-frequency switch tubes Q1, Q2, Q3 and Q4, power frequency switch tubes Q5 and Q6, high-frequency filter inductors L1 and L2, power frequency filter inductors L3 and L4, a resonance-suppressing resistor R, auxiliary conducting diodes D1, D2, D3, D4, D5 and D6, and a filter capacitor C. Further, freewheeling current diodes D7 and D8 may be added in the circuit.

In this embodiment, the negative poles of only D5 and D6 are connected to the positive pole of the direct current source, the positive pole of D5 is connected to a connection point between the second inductor and the alternating current source, the positive pole of D6 is connected to a connection point between the first inductor and the alternating current source. The positive poles of D7 and D8 are connected to the negative pole of the DC, the negative pole of D7 is connected to the positive pole of D5, and the negative pole of D8 is connected to the positive pole of D6. The other parts are the same as those in Embodiment 6, and are not detailed here again.

The direct current source may be an apparatus supplying direct current, for example, a fuel cell, a Ni-MH battery, an iron battery, a lead acid battery, a solar panel. The switch tube may be a MOSFET, an IGBT, a triode, a thyristor, or the like. The diode may be a Schottky diode, a fast recovery diode, a silicon tube, carborundum, or a plurality of serially connected diodes. The switch tube and the diode that is connected in reversely parallel to the switch tube may be independent elements, or an integrated element, or the switch tube and its parasitic diode of the switch tube. The alternating current source may be an isolated transformer. An output waveform may be a square wave, a sine wave, a triangle wave, a sawtooth wave, or the like.

The inverter topology circuit provided in this embodiment is capable of implementing soft switching of a high-frequency switch, thereby effectively reducing turn-on and turn-off loss of a high-frequency switch, and improving working efficiency. The inverter topology circuit is capable of compensating for reactive power, thereby satisfying the requirements of the inductive or capacitive load of the alternating current source, and improving the utilization rate of the electric energy. Further, the inverter topology circuit may also be used in boost and buck modes, thereby implementing voltage input within a wide range. In addition, the leakage current caused by a solar non-isolated photovoltaic inverter circuit is prevented effectively, and safety is improved.

Embodiment 8

Figure 7A:
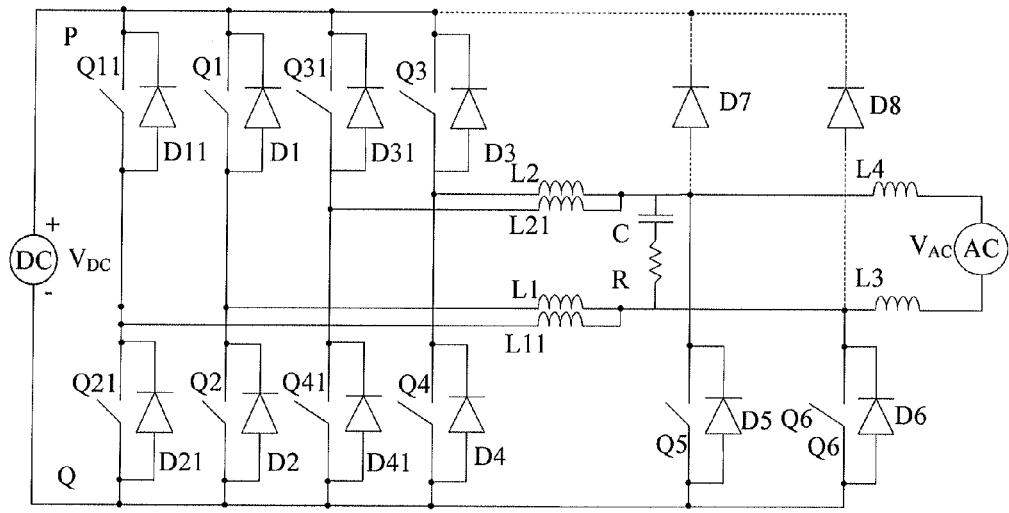
FIG. 7A is a seventeenth schematic diagram of an inverter topology circuit according to an embodiment of the present application.

An embodiment of the present application provides an inverter topology circuit, including at least two inverter circuit bridge arms. An example that two bridge arms are connected in parallel is taken for description. As shown in FIG. 7A, the inverter topology circuit includes a direct current power DC, an alternating current source AC, high-frequency switch tubes Q1, Q2, Q3 and Q4 in a first bridge arm, auxiliary conducting diodes D1, D2, D3 and D4 in the first bridge arm, high-frequency switch tubes Q11, Q21, Q31 and Q41 in a second bridge arm, auxiliary conducting diodes D11, D21, D31 and D41 in the second bridge arm, high-frequency filter inductors L1 and L2 in the first bridge arm, high-frequency filter inductors L11 and L21 in the second bridge arm, power frequency switch tubes Q5 and Q6, auxiliary conducing diodes D5 and D6, power frequency filter inductors L3 and L4, a resonance-suppressing resistor R, freewheeling current diodes D7 and D8, and a filter capacitor C.

Specifically, Q1 is connected in parallel to D1, Q2 is connected in parallel to D2, Q3 is connected in parallel to D3, and Q4 is connected in parallel to D4. D1 is serially connected to D2 to form a first branch of a first bridge arm, D3 is serially connected to D4 to form a second branch of the first bridge arm, and the two branches are both connected in parallel to two poles of the direct current source. The negative poles of D1 and D3 are connected to the positive pole of the DC, and the positive poles of D2 and D4 are connected to the negative pole of the DC.

One end of L1 is connected to a connection point between D1 and D2, and the other end of L1 is connected to one pole of the AC. One end of L2 is connected to a connection point between D3 and D4, and the other end of L2 is connected to the other pole of the AC. One end of the capacitor C is connected to L2 and the other end is connected to the resistor R, to form a serial circuit, where R is arranged between C and L1.

Q5 is connected in parallel to D5 and Q6 is connected in parallel to D6. The positive pole of D5 is connected to the negative pole of the DC, and the negative pole of D5 is connected to a connection point between L2 and the AC. The positive pole of D6 is connected to the negative pole of the DC, and the negative pole of D6 is connected to a connection point between L1 and the AC.

L3 is arranged in a connection circuit between L1 and the AC, one end of L3 is connected to D6 and Q6, and the other end of L3 is connected to one end of the AC. L4 is arranged in a connection circuit between L2 and the AC, one end of L4 is connected to D5 and Q5, and the other end of L4 is connected to the other end of the AC.

The negative poles of D7 and D8 are connected to the positive pole of the DC, the positive pole of D7 is connected to the negative pole of D5, and the positive pole of D8 is connected to the negative pole of D6.

Q11 is connected in parallel to D11, Q21 is connected in parallel to D21, Q31 is connected in parallel to D31, and Q41 is connected in parallel to D41. D11 is serially connected to D21 to form a first branch of the second bridge arm, D31 is serially connected to D41 to form a second branch of the second bridge arm, and the two branches are both connected in parallel to two poles of the DC. The negative poles of D11 and D31 are connected to the positive pole of the DC, the positive poles of D21 and D41 are connected to the negative pole of the DC, and the two branches of the second bridge arm are connected in parallel interleaving to the two branches of the first bridge arm.

One end of L11 is connected to a connection point between D11 and D21, and the other end of L11 is connected to one pole of the AC. One end of L21 is connected to a connection point between D31 and D41, and the other end of L21 is connected to the other pole of the AC. One end of the capacitor C is connected to L21 and the other end is connected to the resistor R, to form a serial circuit, where R is arranged between C and L11.

The direct current source may be an apparatus supplying direct current, for example, a fuel cell, a Ni-MH battery, an iron battery, a lead acid battery, a solar panel. The switch tube may be a MOSFET, an IGBT, a triode, a thyristor, or the like. The diode may be a Schottky diode, a fast recovery diode, a silicon tube, carborundum, or a plurality of serially connected diodes. The switch tube and the diode that is connected in reversely parallel to the switch tube may be independent elements, or an integrated element, or the switch tube and its parasitic diode of the switch tube. The alternating current source may be an isolated transformer. An output waveform may be a square wave, a sine wave, a triangle wave, a sawtooth wave, or the like.

The inverter topology circuit may include two or more bridge arms for interleaving. This reduces ripple waves of an output current, and improves output power.

The inverter topology circuit may be applied to a solar non-isolated inverter, or applied in buck Buck and boost Boost working modes, or applied to reactive power compensation.

The inverter topology circuit provided in this embodiment is capable of implementing soft switching of a high-frequency switch, thereby reducing power consumption, and improving working efficiency. The inverter topology circuit is capable of compensating for reactive power, thereby satisfying the requirements of the inductive or capacitive load of the alternating current source, and improving the utilization rate of the electric energy. The inverter topology circuit implements parallel connection of a plurality of bridge arms, to improve output power. Further, the inverter topology circuit may also be used in boost and buck modes, thereby implementing voltage input within a wide range. In addition, the leakage current caused by a solar non-isolated photovoltaic inverter circuit is prevented effectively, and safety is improved.

Embodiment 9

Figure 7B:
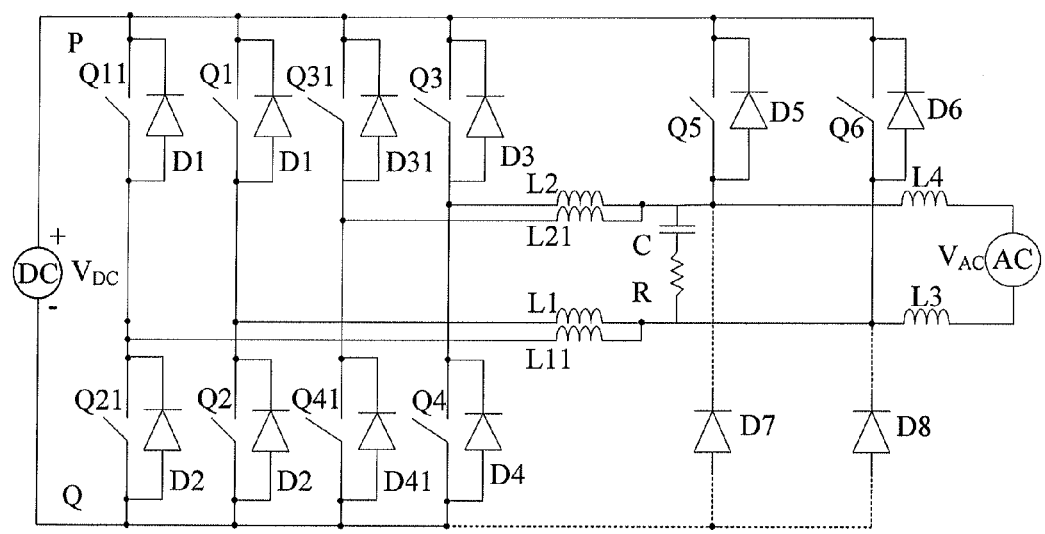
FIG. 7B is an eighteenth schematic diagram of an inverter topology circuit according to an embodiment of the present application.

An embodiment of the present application provides an inverter topology circuit, including at least two inverter circuit bridge arms. An example that two bridge arms are connected in parallel is taken for description. As shown in FIG. 7B, the inverter topology circuit includes a direct current source DC, an alternating current source AC, high-frequency switch tubes Q1, Q2, Q3 and Q4 in a first bridge arm, auxiliary conducting diodes D1, D2, D3 and D4 in the first bridge arm, high-frequency switch tubes Q11, Q21, Q31 and Q41 in a second bridge arm, auxiliary conducting diodes D11, D21, D31 and D41 in the second bridge arm, high-frequency filter inductors L1 and L2 in the first bridge arm, high-frequency filter inductors L11 and L21 in the second bridge arm, power frequency switch tubes Q5 and Q6, auxiliary conducing diodes D5 and D6, power frequency filter inductors L3 and L4, a resonance-suppressing resistor R, freewheeling current diodes D7 and D8, and a filter capacitor C.

In this embodiment, the negative poles of only D5 and D6 are connected to the positive pole of the direct current source, the positive pole of D5 is connected to a connection point between the second inductor and the alternating current source, the positive pole of D6 is connected to a connection point between the first inductor and the alternating current source. The positive poles of D7 and D8 are connected to the negative pole of the DC, the negative pole of D7 is connected to the positive pole of D5, and the negative pole of D8 is connected to the positive pole of D6. The other parts are the same as those in Embodiment 6, and are not detailed here again.

The direct current source may be an apparatus supplying direct current, for example, a fuel cell, a Ni-MH battery, an iron battery, a lead acid battery, a solar panel. The switch tube may be a MOSFET, an IGBT, a triode, a thyristor, or the like. The diode may be a Schottky diode, a fast recovery diode, a silicon tube, carborundum, or a plurality of serially connected diodes. The switch tube and the diode that is connected in reversely parallel to the switch tube may be independent elements, or an integrated element, or the switch tube and its parasitic diode of the switch tube. The alternating current source may be an isolated transformer. An output waveform may be a square wave, a sine wave, a triangle wave, a sawtooth wave, or the like.

The inverter topology circuit provided in this embodiment is capable of implementing soft switching of a high-frequency switch, thereby reducing power consumption, and improving working efficiency. The inverter topology circuit is capable of compensating for reactive power, thereby satisfying the requirements of the inductive or capacitive load of the alternating current source, and improving the utilization rate of the electric energy. The inverter topology circuit implements parallel connection of a plurality of bridge arms, to improve output power. Further, the inverter topology circuit may also be used in boost and buck modes, thereby implementing voltage input within a wide range. In addition, the leakage current caused by a solar non-isolated photovoltaic inverter circuit is prevented effectively, and safety is improved.

Embodiment 10

Figure 3C:
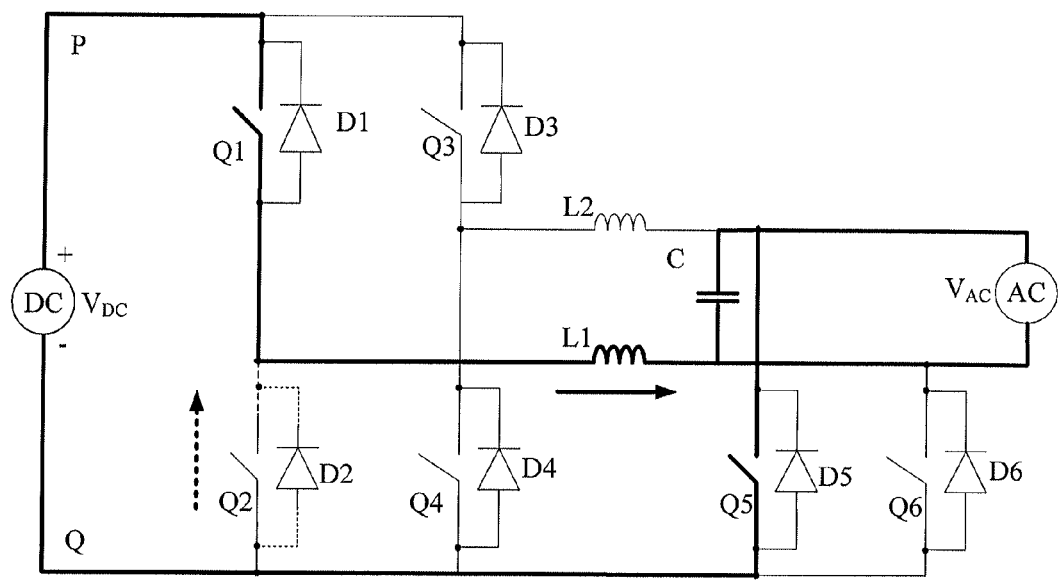
FIG. 3C is a third schematic diagram of an inverter topology circuit according to an embodiment of the present application.

An embodiment of the present application provides an inversion method. As shown in FIG. 3C, within a half cycle where Q5 is connected, Q3, Q4 and Q6 are turned off, high-frequency turn-on and turn-off control is performed for Q1 and Q2 under the action of a control voltage or a control current.

When Q1 is turned on and Q2 is turned off, a current flows from the positive pole of a direct current source, travels through Q1, L1, C and Q5, and finally returns to the negative pole of the direct current source. A part of the current flows through L1, an alternating current source and Q5, and reaches the negative pole of the direct current source. In this case, the current on L1 increases gradually, and L1 outputs power to the alternating current source. After Q1 is turned off, because of the freewheeling current function of the inductor L1, the current flows from L1, travels through the alternating current source, Q5 and D2, and finally returns to L1. In this case, Q2 is turned on under the control of the control voltage or the control current. The conducting voltage drop of D2 is small, approximately 0. Therefore, the approximate voltage between the two ends of Q2 is 0. In this case, Q2 is controlled to be turned on, and no turn-on loss is caused. Therefore, a soft switch for turning on ZVS (Zero Voltage Switching, zero voltage switching) is implemented.

When Q1 is turned off and Q2 is turned on, the current on L1 gradually decreases. When the current decreases to 0, because of the energy storage function of the filter capacitor C and existence of the alternating current source, the current on L1 flows reversely. That is, the current flows from C, L1, Q2 and Q5 to the other end of the filter capacitor C. Another path is that the current flows from the alternating current source, travels through L1, Q2 and Q5, and finally returns to the alternating current source. When a small reverse current flows through L1 or the current is 0, because the current is small, approximately 0, turning off Q2 will not cause turn-off loss. Therefore, a soft switch for turning off ZCS (Zero Current Switching, Zero Current Switching) is implemented. After Q2 is turned off, because of the freewheeling current function of the inductor L1, the current flows from L1, travels through D1, the direct current source and Q5, returns to the filter capacitor C and the alternating current source, and finally returns to L1. In this case, because D1 is conducted, and the conducting voltage drop is small, approximately 0, the voltage between the two ends of Q1 is 0. In this case, Q1 is controlled to be turned on, and no turn-on loss is caused for Q1. Therefore, a soft switch for turning on ZVS is implemented. Subsequently, the reverse current quickly decreases to 0, and under the action of the direct current source, a positive current flows through the inductor L1 and the current increases gradually. A high-frequency switching cycle is over. A current with different inductor peaks is obtained by sampling the alternating current source or controlling the conduction time of Q1 according to a reference waveform.

Figure 3D:
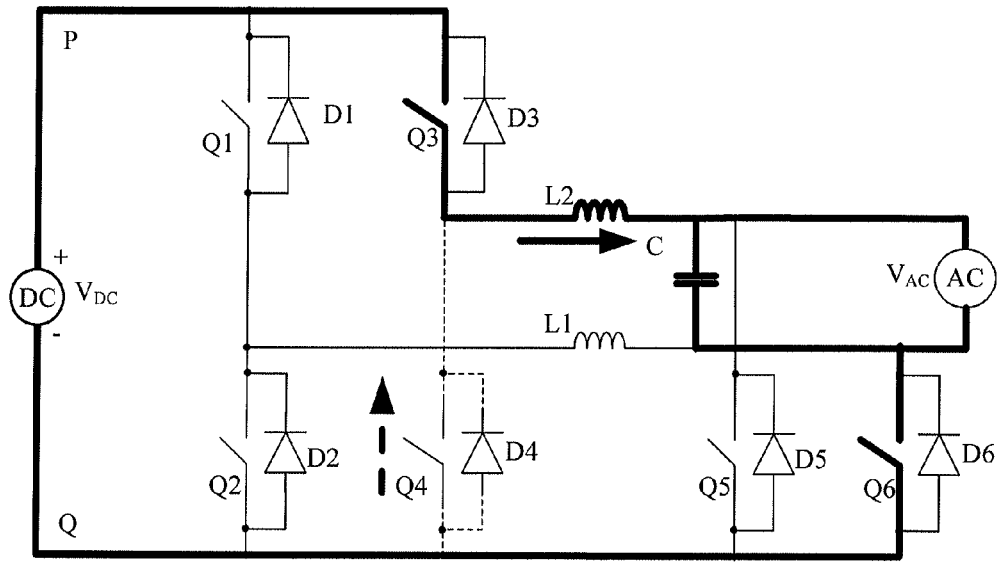
FIG. 3D is a fourth schematic diagram of an inverter topology circuit according to an embodiment of the present application.

As shown in FIG. 3D, within a half cycle where Q6 is turned on, Q1, Q2 and Q5 are turned off, high-frequency turn-on and turn-off control is performed for Q3 and Q4 under the action of a control voltage or a control current.

When Q3 is turned on and Q4 is turned off, the current flows from the positive pole of the direct current source, travels through Q3, L2, C and Q6, and finally returns to the negative pole of the direct current source. A part of the current flows through L2, the alternating current source and Q6, and reaches the negative pole of the direct current source. In this case, the current on L2 increases gradually, and L2 outputs power to the alternating current source. After Q3 is turned off, because of the freewheeling current function of the inductor L2, the current flows from L2, travels through the alternating current source, Q6 and D4, and finally returns to L2. In this case, Q4 is turned on under the control of the control voltage or the control current. The conducting voltage drop of D4 is small, approximately 0. Therefore, the approximate voltage between the two ends of Q4 is 0. In this case, Q4 is controlled to be turned on, and no turn-on loss is caused. Therefore, a soft switch for turning on ZVS is implemented.

When Q3 is turned off and Q4 is turned on, the current on L2 gradually decreases. When the current decreases to 0, because of the energy storage function of the filter capacitor C and existence of the alternating current source, the current on L2 flows reversely. That is, the current flows from C, L2, Q4 and Q6 to the other end of the filter capacitor C. Another path is that the current flows from the alternating current source, travels through L2, Q4 and Q6, and finally returns to the alternating current source. When a small reverse current flows through L2 or the current is 0, because the current is small, approximately 0, turning off Q4 will not cause turn-off loss. Therefore, a soft switch for turning off ZCS is implemented. After Q4 is turned off, because of the freewheeling current function of the inductor L2, the current flows from L2, travels through D3, the direct current source and Q6, returns to the filter capacitor C and the alternating current source, and finally returns to L2. In this case, because D3 is conducted, and the conducting voltage drop is small, approximately 0, the voltage between the two ends of Q3 is 0. In this case, Q3 is controlled to be turned on, and no turn-on loss is caused for Q3. Therefore, a soft switch for turning on ZVS is implemented. Subsequently, the reverse current quickly decreases to 0, and under the action of the direct current source, a positive current flows through the inductor L2 and the current increases gradually. A high-frequency switching cycle is over. A current with different inductor peaks is obtained by sampling the alternating current source or controlling the conduction time of Q3 according to a reference waveform.

The inversion method provided in this embodiment is capable of implementing soft switching of a high-frequency switch, thereby effectively reducing turn-on and turn-off loss of a high-frequency switch, and improving working efficiency.

Embodiment 11

An embodiment of the present application provides an inversion method. As shown in FIG. 3B, the negative poles of only D5 and D6 are connected to the positive pole of a direct current source, the positive pole of D5 is connected to a connection point between a second inductor and an alternating current source, the positive pole of D6 is connected to a connection point between a first inductor and the alternating current source. Other parts are the same as those in Embodiment 10, and reference can be made to Embodiment 10, so details are not repeated here again.

The inversion method provided in this embodiment is capable of implementing soft switching of a high-frequency switch, thereby effectively reducing turn-on and turn-off loss of a high-frequency switch, and improving working efficiency.

Embodiment 12

Figure 4C:
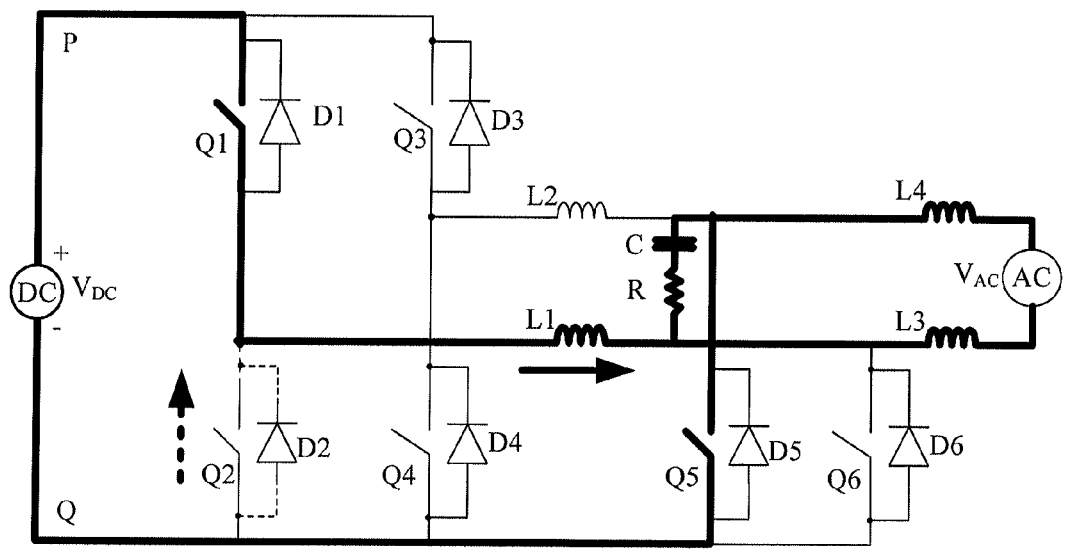
FIG. 4C is a seventh schematic diagram of an inverter topology circuit according to an embodiment of the present application.

An embodiment of the present application provides an inversion method. As shown in FIG. 4C, within a half cycle where Q5 is turned on, Q3, Q4 and Q6 are turned off, high-frequency turn-on and turn-off control is performed for Q1 and Q2 under the action of a control voltage or a control current.

When Q1 is turned on and Q2 is turned off, a current flows from the positive pole of a direct current source, travels through Q1, L1, R, C and Q5, and finally returns to the negative pole of the direct current source. A part of the current flows through L1, L3, an alternating current source, L4 and Q5, and reaches the negative pole of the direct current source. In this case, the current on L1 increases gradually, and L1 outputs power to the alternating current source. After Q1 is turned off, because of the freewheeling current function of the inductor L1, the current flows from L1, travels through the alternating current source, Q5 and D2, and finally returns to L1. In this case, Q2 is turned on under the control of the control voltage or the control current. The conducting voltage drop of D2 is small, approximately 0. Therefore, the approximate voltage between the two ends of Q2 is 0. In this case, Q2 is controlled to be turned on, and no turn-on loss is caused. Therefore, a soft switch for turning on ZVS (Zero Voltage Switching, zero voltage switching) is implemented.

When Q1 is turned off and Q2 is turned on, the current on L1 gradually decreases. When the current decreases to 0, because of the energy storage function of the filter capacitor C and existence of the alternating current source, the current on L1 flows reversely. That is, the current flows from C, R, L1, Q2 and Q5 to the other end of the filter capacitor C. Another path is that the current flows from the alternating current source, travels through L3, L1, Q2, Q5 and L4, and finally returns to the alternating current source. When a small reverse current flows through L1 or the current is 0, because the current is small, approximately 0, turning off Q2 will not cause turn-off loss. Therefore, a soft switch for turning off ZCS (Zero Current Switching, Zero Current Switching) is implemented. After Q2 is turned off, because of the freewheeling current function of the inductor L1, the current flows from L1, travels through D1, the direct current source and Q5, returns to the filter capacitor C and the alternating current source, and finally returns to L1. In this case, because D1 is conducted, and the conducting voltage drop is small, approximately 0, the voltage between the two ends of Q1 is 0. In this case, Q1 is controlled to be turned on, and no turn-on loss is caused for Q1. Therefore, a soft switch for turning on ZVS is implemented. Subsequently, the reverse current quickly decreases to 0, and under the action of the direct current source, a positive current flows through the inductor L1 and the current increases gradually. A high-frequency switching cycle is over. A current with different inductor peaks is obtained by sampling the alternating current source or controlling the conduction time of Q1 according to a reference waveform.

Figure 4D:
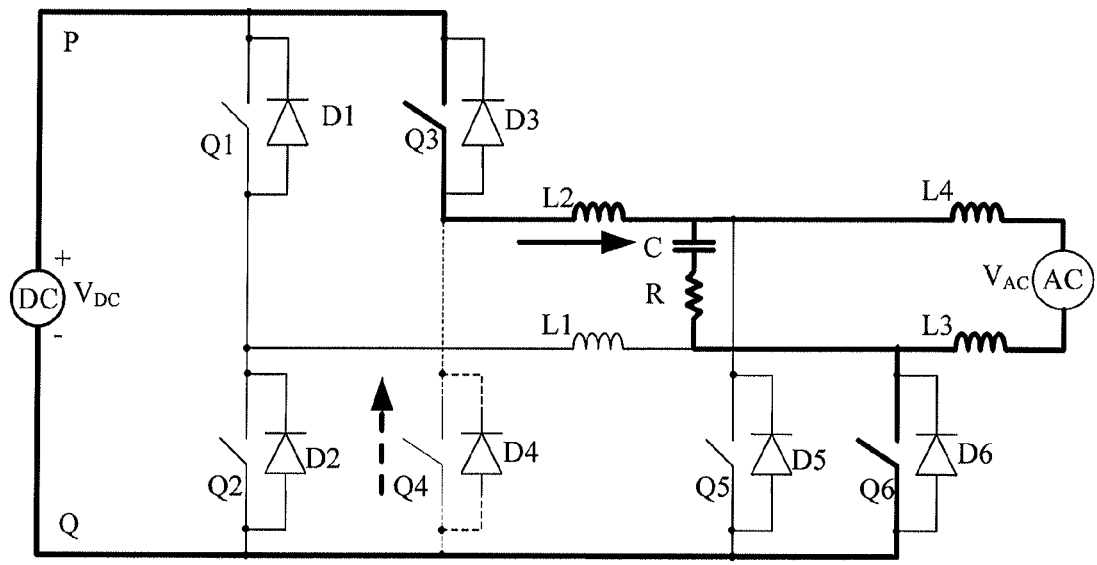
FIG. 4D is an eighth schematic diagram of an inverter topology circuit according to an embodiment of the present application.

As shown in FIG. 4D, within a half cycle where Q6 is turned on, Q1, Q2 and Q5 are turned off, high-frequency turn-on and turn-off control is performed for Q3 and Q4 under the action of a control voltage or a control current.

When Q3 is turned on and Q4 is turned off, the current flows from the positive pole of the direct current source, travels through Q3, L2, C and Q6, and finally returns to the negative pole of the direct current source. A part of the current flows through L2, L4, the alternating current source, L3 and Q6, and reaches the negative pole of the direct current source. In this case, the current on L2 increases gradually, and L2 outputs power to the alternating current source. After Q3 is turned off, because of the freewheeling current function of the inductor L2, the current flows from L2, travels through L4, the alternating current source, L3, Q6 and D4, and finally returns to L2. In this case, Q4 is turned on under the control of the control voltage or the control current. The conducting voltage drop of D4 is small, approximately 0. Therefore, the approximate voltage between the two ends of Q4 is 0. In this case, Q4 is controlled to be turned on, and no turn-on loss is caused. Therefore, a soft switch for turning on ZVS is implemented.

When Q3 is turned off and Q4 is turned on, the current on L2 gradually decreases. When the current decreases to 0, because of the energy storage function of the filter capacitor C and existence of the alternating current source, the current on L2 flows reversely. That is, the current flows from C, L2, Q4, Q6 and R to the other end of the filter capacitor C. Another path is that the current flows from the alternating current source, travels through L4, L2, Q4, Q6 and L3, and finally returns to the alternating current source. When a small reverse current flows through L2 or the current is 0, because the current is small, approximately 0, turning off Q4 will not cause turn-off loss. Therefore, a soft switch for turning off ZCS is implemented. After Q4 is turned off, because of the freewheeling current function of the inductor L2, the current flows from L2, travels through D3, the direct current source and Q6, returns to the filter capacitor C and the alternating current source, and finally returns to L2. In this case, because D3 is conducted, and the conducting voltage drop is small, approximately 0, the voltage between the two ends of Q3 is 0. In this case, Q3 is controlled to be turned on, and no turn-on loss is caused for Q3. Therefore, a soft switch for turning on ZVS is implemented. Subsequently, the reverse current quickly decreases to 0, and under the action of the direct current source, a positive current flows through the inductor L2 and the current increases gradually. A high-frequency switching cycle is over. A current with different inductor peaks is obtained by sampling the alternating current source or controlling the conduction time of Q3 according to a reference waveform.

By adding the filtering of the power frequency filter inductors L3 and L4 and the filter capacitor C, and the resonance suppression function of the resistor R, a better output waveform is obtained.

The inverter topology circuit may be applicable to a solar non-isolated inverter. The direct current source is equivalent to a solar panel, the alternating current source is a power grid, and one end of the alternating current source is grounded. When a high-frequency current flows through the resistor R having small resistance and the capacitor C, and the power frequency inductors L3 and L4 perform power frequency filtering, the voltage applied between R and C is almost close to the voltage of the alternating current source. Therefore, the change rate of the voltage is small, and the common-modulus leakage current caused to the ground by the positive pole of the solar panel having a large area is also small.

Figure 4E:
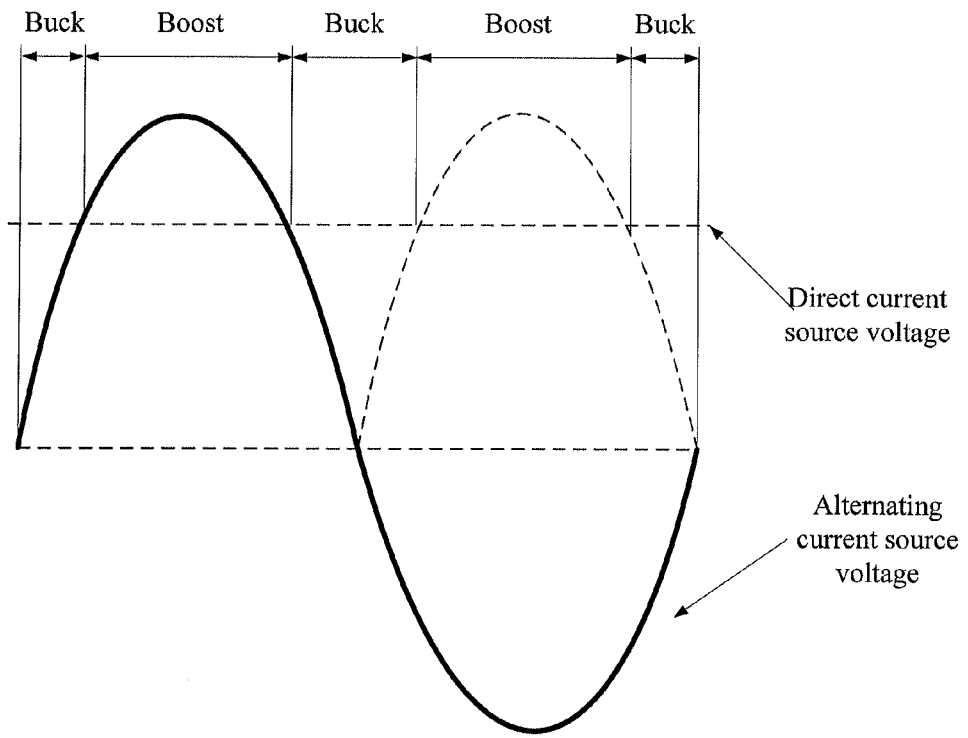
FIG. 4E is a schematic diagram of implementation of boost and buck conversion in an inverter topology circuit according to an embodiment of the present application.
Figure 4F:
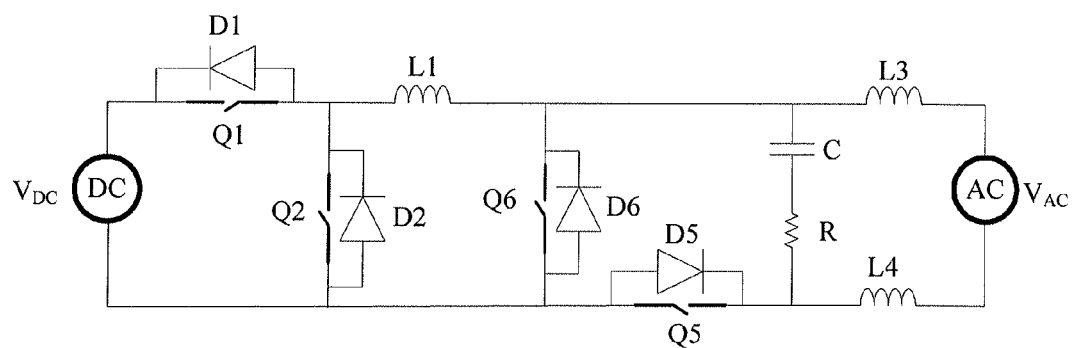
FIG. 4F is a ninth schematic diagram of an inverter topology circuit according to an embodiment of the present application.
Figure 4G:
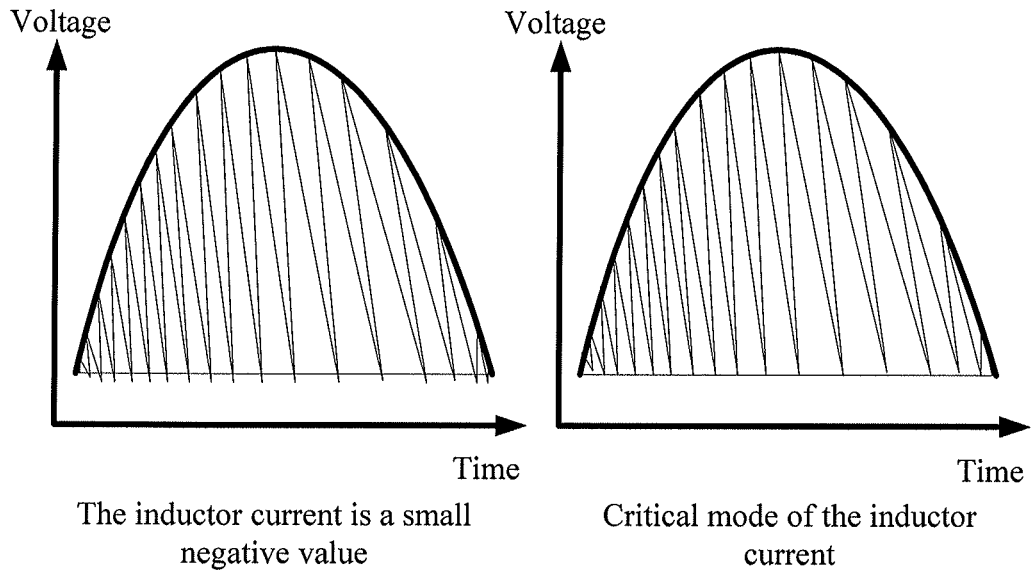
FIG. 4G is a schematic diagram of an inductor waveform flow of an inverter topology circuit according to an embodiment of the present application.

The inverter topology circuit may also be applied in buck Buck and boost Boost working modes. FIG. 4E is a schematic diagram of the buck Buck and boost Boost working modes. Specifically, within a first half cycle, FIG. 4F shows an equivalent circuit diagram of FIG. 4A. When an output voltage is less than the voltage of the direct current source, the circuit works in Buck mode, and Q1, Q2 (D2), L1, C, R, L3, L4 and Q5 are involved in the working. When Q1 is conducted, the inductor current of L1 increases; and when Q1 is turned off and Q2 is turned on, the inductor L1 starts a freewheeling current. When the voltage of the alternating current source is greater than the voltage of the direct current source, the circuit works in Boost mode, and Q1, L1, Q6, C, R, L3, L4 and Q5 are involved in the working. When Q1 is constantly conducted, Q6 is conducted. When Q5 is turned off, the inductor current of L1 increases. When Q6 is turned off, and Q5 is conducted, the inductor L1 starts a freewheeling current. The inductor current of the inductor L1 obtained by control is as shown in FIG. 4G: An inductor current critical mode is used or the inductor current is negative and of a small value to implement soft switching and achieve high conversion efficiency. Within a second half cycle, Q3 (D3), Q4 (D4), L2, C, R, Q5 (D5), Q6 (D6), L3 and L4 are involved in the working. For the specific content, reference can be made to the first half cycle, and details are not repeated here again.

The inverter topology circuit may also be applied to reactive power consumption. As shown in FIG. 4A, bipolar modulation is used, Q1 and Q4 are turned on or turned off concurrently; Q3 and Q2 are turned on or turned off; and Q5 and Q6 are not involved in the working. This working mode may be an inductor continuous mode. FIG. 4G shows the inductor current critical mode analyzed above, and the inductor current is a small negative value.

The inversion method provided in this embodiment is capable of implementing soft switching of a high-frequency switch, thereby effectively reducing turn-on and turn-off loss of a high-frequency switch, and improving working efficiency. The inversion method is capable of compensating for reactive power, thereby satisfying the requirements of the inductive or capacitive load of the alternating current source, and improving the utilization rate of the electric energy. Further, the inversion method may also be used in boost and buck modes, thereby implementing voltage input within a wide range. In addition, the leakage current caused by a solar non-isolated photovoltaic inverter circuit is prevented effectively, and safety is improved.

Embodiment 13

An embodiment of the present application provides an inversion method. As shown in FIG. 4B, in this embodiment, the negative poles of only D5 and D6 are connected to the positive pole of a direct current source, the positive pole of D5 is connected to a connection point between a second inductor and an alternating current source, the positive pole of D6 is connected to a connection point between a first inductor and the alternating current source. Other parts are the same as those in Embodiment 12, and reference can be made to Embodiment 12, so details are not repeated here again.

The inversion method provided in this embodiment is capable of implementing soft switching of a high-frequency switch, thereby effectively reducing turn-on and turn-off loss of a high-frequency switch, and improving working efficiency. The inversion method is capable of compensating for reactive power, thereby satisfying the requirements of the inductive or capacitive load of the alternating current source, and improving the utilization rate of the electric energy. Further, the inversion method may also be used in boost and buck modes, thereby implementing voltage input within a wide range. In addition, the leakage current caused by a solar non-isolated photovoltaic inverter circuit is prevented effectively, and safety is improved.

Embodiment 14

Figure 5C:
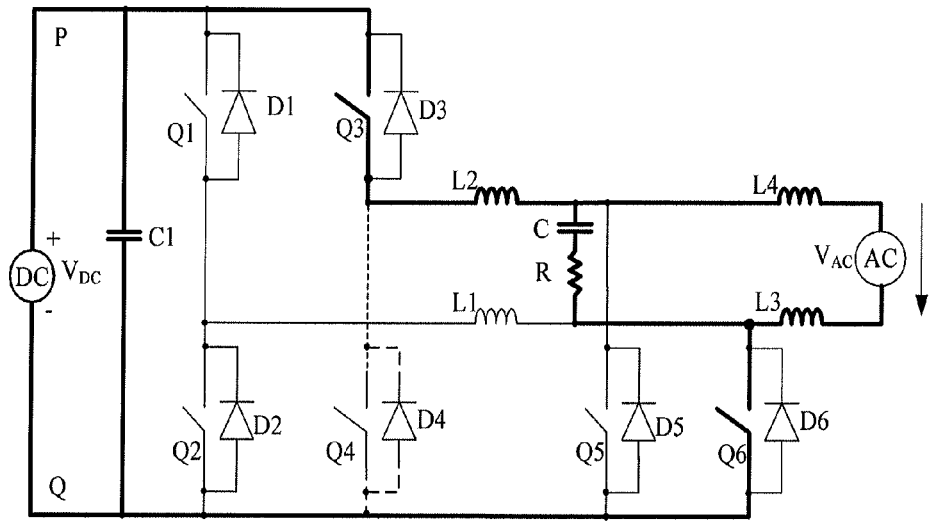
FIG. 5C is an eleventh schematic diagram of an inverter topology circuit according to an embodiment of the present application.
Figure 5D:
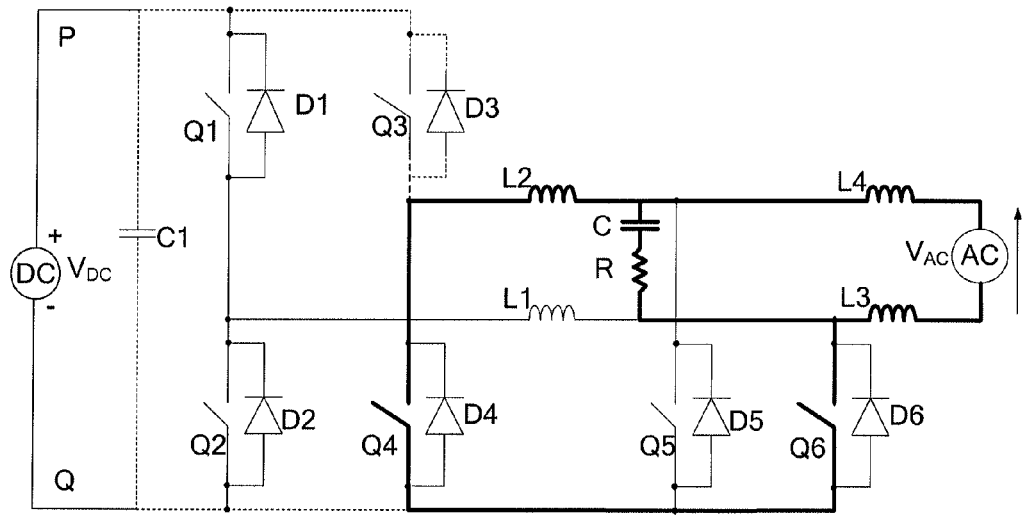
FIG. 5D is a twelfth schematic diagram of an inverter topology circuit according to an embodiment of the present application.
Figure 5E:
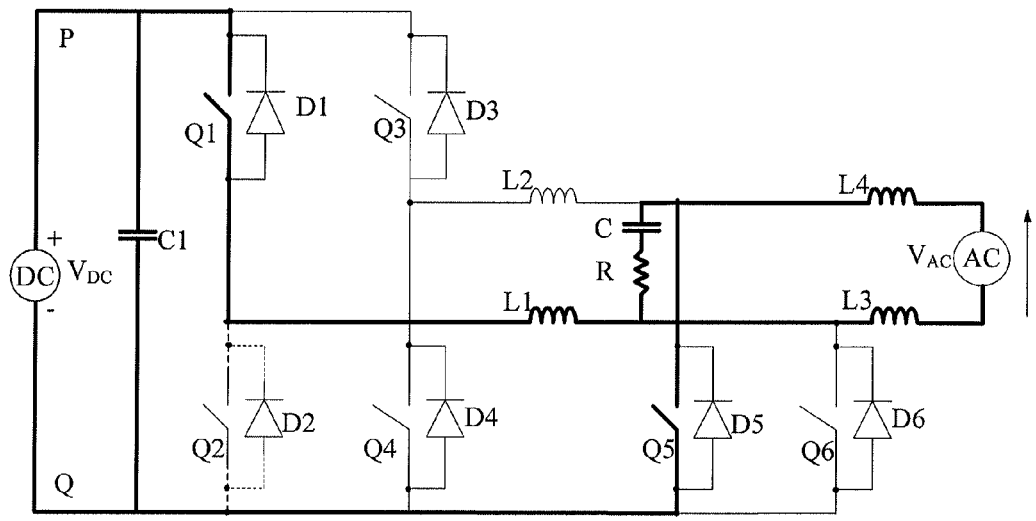
FIG. 5E is a thirteenth schematic diagram of an inverter topology circuit according to an embodiment of the present application.

An embodiment of the present application provides an inversion method, applicable to reactive power compensation. FIG. 5A is a schematic diagram of a relationship between an output voltage and an output current. Within time periods T1 and T3, the output voltage and the output current are in the same phase. As shown in FIG. 5C and FIG. 5E, the working principles of the inversion method are the same as those in the case where the inverter circuit outputs active power normally. For the specific content, reference can be made to Embodiment 12, and details are not repeated here again.

The output voltage and the output current are reverse in two time periods T2 and T4, and the mains inputs reactive power to the inverter. Specifically, as shown in FIG. 5D, within time period T2, Q4 is used as a primary switch, Q6 is used as a secondary switch, and Q1, Q2, Q3 and Q5 are turned off. When Q4 is conducted, the current flows from an alternating current source, travels through L4, L2, Q4, Q6 (D6) and L3, and finally returns to the alternating current source. Another path is that the current flows from C, travels through L2, Q4, Q6 (D6) and R, and finally returns to C to form a loop. When Q4 is turned off (Q6 is still turned on), the current on L2 flows through D3 to C1, and travels through Q6 (D6) to form a loop. Different output currents may be obtained by adjusting conduction time of Q4.

Figure 5F:
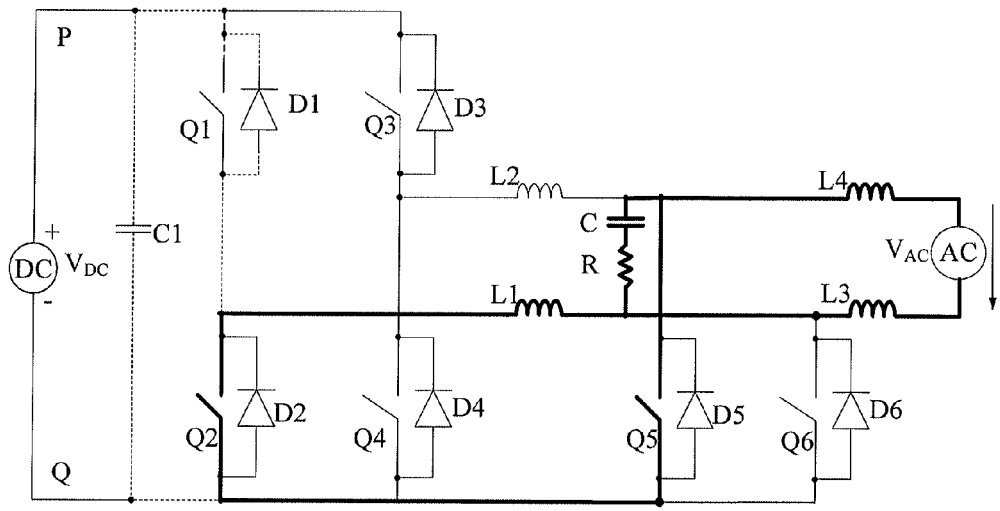
FIG. 5F is a fourteenth schematic diagram of an inverter topology circuit according to an embodiment of the present application.

As shown in FIG. 5F, within time period T4, Q2 is used as a primary switch, Q5 is used as a secondary switch, and Q1, Q3, Q4 and Q6 are turned off. When Q2 is turned on, the current flows from the alternating current source, travels through L3, L1, Q2, Q5 (D6) and L4, and finally returns to the alternating current source. Another path is that the current flows from C, travels through R, L1, Q2 and Q5 (D5), and finally returns to C to form a loop. When Q2 is turned off (Q5 is still turned on), the current on L1 flows through D1 to C1, and travels through Q5 (D5) to form a loop. Different output currents may be obtained by adjusting conduction time of Q2.

The inverter topology circuit may be applied to a solar non-isolated inverter, or applied in buck Buck and boost Boost working modes. For the specific content, reference can be made to Embodiment 12, and details are not repeated here again.

The inversion method provided in this embodiment is capable of implementing soft switching of a high-frequency switch, thereby effectively reducing turn-on and turn-off loss of a high-frequency switch, and improving working efficiency. The inversion method is capable of compensating for reactive power, thereby satisfying the requirements of the inductive or capacitive load of the alternating current source, and improving the utilization rate of the electric energy. Further, the inversion method may also be used in boost and buck modes, thereby implementing voltage input within a wide range. In addition, the leakage current caused by a solar non-isolated photovoltaic inverter circuit is prevented effectively, and safety is improved.

Embodiment 15

An embodiment of the present application provides an inversion method, applicable to reactive power compensation. As shown in FIG. 6A, diodes D7 and D8 exercise the freewheeling current function. Bipolar modulation may be used. When Q1 and Q5 are turned on or turned off concurrently, Q2 (D2) and D7 start freewheeling currents concurrently. When Q3 and Q6 are turned on or turned off concurrently, Q4 (D4) and D8 start freewheeling currents concurrently. The working mode of this circuit may be an inductor continuous mode. FIG. 4G shows an inductor current critical mode, or an inductor current is a small negative value.

The inverter topology circuit may be applied to a solar non-isolated inverter, or applied in buck Buck and boost Boost working modes. For the specific content, reference can be made to Embodiment 12, and details are not repeated here again.

The inversion method provided in this embodiment is capable of implementing soft switching of a high-frequency switch, thereby effectively reducing turn-on and turn-off loss of a high-frequency switch, and improving working efficiency. The inversion method is capable of compensating for reactive power, thereby satisfying the requirements of the inductive or capacitive load of the alternating current source, and improving the utilization rate of the electric energy. Further, the inversion method may also be used in boost and buck modes, thereby implementing voltage input within a wide range. In addition, the leakage current caused by a solar non-isolated photovoltaic inverter circuit is prevented effectively, and safety is improved.

Embodiment 16

An embodiment of the present application provides an inversion method. As shown in FIG. 6B, the negative poles of only D5 and D6 are connected to the positive pole of a direct current source, the positive pole of D5 is connected to a connection point between a second inductor and an alternating current source, the positive pole of D6 is connected to a connection point between a first inductor and the alternating current source. The positive poles of D7 and D8 are connected to the negative pole of the DC, the negative pole of D7 is connected to the positive pole of D5, and the negative pole of D8 is connected to the positive pole of D6. For the specific content, reference can be made to Embodiment 15, and details are not repeated here again.

The inversion method provided in this embodiment is capable of implementing soft switching of a high-frequency switch, thereby effectively reducing turn-on and turn-off loss of a high-frequency switch, and improving working efficiency. The inversion method is capable of compensating for reactive power, thereby satisfying the requirements of the inductive or capacitive load of the alternating current source, and improving the utilization rate of the electric energy. Further, the inversion method may also be used in boost and buck modes, thereby implementing voltage input within a wide range. In addition, the leakage current caused by a solar non-isolated photovoltaic inverter circuit is prevented effectively, and safety is improved.

Embodiment 17

An embodiment of the present application provides an inversion method. As shown in FIG. 7A, this inverter topology circuit may includes two or more bridge arms for interleaving. This reduces ripple waves of an output current, and improves output power. The working principles are similar to those in Embodiment 12, and reference can be made to Embodiment 12, so details are not repeated here again.

The inverter topology circuit may be applied to a solar non-isolated inverter, or applied in buck Buck and boost Boost working modes, or applied to reactive power compensation. For the specific content, reference can be made to Embodiment 12, and details are not repeated here again.

The inversion method provided in this embodiment is capable of implementing soft switching of a high-frequency switch, thereby effectively reducing turn-on and turn-off loss of a high-frequency switch, and improving working efficiency. The inversion method is capable of compensating for reactive power, thereby satisfying the requirements of the inductive or capacitive load of the alternating current source, and improving the utilization rate of the electric energy. The inversion method implements parallel connection of a plurality of bridge arms, to improve output power. Further, the inverter topology circuit may also be used in boost and buck modes, thereby implementing voltage input within a wide range. In addition, the leakage current caused by a solar non-isolated photovoltaic inverter circuit is prevented effectively, and safety is improved.

Embodiment 18

An embodiment of the present application provides an inversion method. As shown in FIG. 7B, in this embodiment, the negative poles of only D5 and D6 are connected to the positive pole of a direct current source, the positive pole of D5 is connected to a connection point between a second inductor and an alternating current source, the positive pole of D6 is connected to a connection point between a first inductor and the alternating current source. The positive poles of D7 and D8 are connected to the negative pole of the DC, the negative pole of D7 is connected to the positive pole of D5, and the negative pole of D8 is connected to the positive pole of D6. For the specific content, reference can be made to Embodiment 17, and details are not repeated here again.

The inversion method provided in this embodiment is capable of implementing soft switching of a high-frequency switch, thereby effectively reducing turn-on and turn-off loss of a high-frequency switch, and improving working efficiency. The inversion method is capable of compensating for reactive power, thereby satisfying the requirements of the inductive or capacitive load of the alternating current source, and improving the utilization rate of the electric energy. The inversion method implements parallel connection of a plurality of bridge arms, to improve the output power. Further, the inverter topology circuit may also be used in boost and buck modes, thereby implementing voltage input within a wide range. In addition, the leakage current caused by a solar non-isolated photovoltaic inverter circuit is prevented effectively, and safety is improved.

Embodiment 19

An embodiment of the present application provides an inverter, including the inverter topology circuit according to Embodiments 1-9.

The inverter provided in this embodiment of the present application is capable of implementing soft switching of a high-frequency switch, thereby effectively reducing turn-on and turn-off loss of a high-frequency switch, and improving working efficiency. The inverter is capable of compensating for reactive power, thereby satisfying the requirements of the inductive or capacitive load of the alternating current source, and improving the utilization rate of the electric energy. The inverter implements parallel connection of a plurality of bridge arms, to improve the output power. Further, the inverter topology circuit may also be used in boost and buck modes, thereby implementing voltage input within a wide range. In addition, the leakage current caused by a solar non-isolated photovoltaic inverter circuit is prevented effectively, and safety is improved.

The above are merely specific implementation of the present application, and the protection scope of the present application is not limited thereto. Modifications or replacements readily thought of by persons skilled in the prior art within the scope disclosed by the present application should fall within the protection scope of the present application. Therefore, the protection scope of the present application is subject to the protection scope of the claims.

The invention claimed is:

1. An inverter topology circuit, comprising:
a direct current source, an alternating current source, a first bridge arm, a first inductor, and a second inductor, wherein the first bridge arm is connected in parallel to two poles of the direct current source, one ends of the first and second inductors are connected to connection points of two branches of the first bridge arm, respectively, and the other ends of the first and second inductors are connected to two poles of the alternating current source, respectively;
a fifth switch tube, a sixth switch tube, a fifth diode, a sixth diode, and a first capacitor; wherein:
the fifth switch tube is connected in parallel to the fifth diode, and the sixth switch tube is connected in parallel to the sixth diode;
same poles of the fifth and sixth diodes are connected to one pole of the direct current source together, the other pole of the fifth diode is connected to a connection point between the second inductor and the alternating current source, and the other pole of the sixth diode is connected to a connection point between the first inductor and the alternating current source; and
the first capacitor is connected in parallel to two poles of the alternating current source.

2. The circuit according to claim 1, wherein the first bridge arm comprises:
a first switch tube, a second switch tube, a third switch tube, a fourth switch tube, a first diode, a second diode, a third diode, and a fourth diode; wherein
the first switch tube is connected in parallel to the first diode, the second switch tube is connected in parallel to the second diode, the first diode is serially connected to the second diode, the negative pole of the first diode is connected to the positive pole of the direct current source, and the positive pole of the second diode is connected to the negative pole of the direct current source; and
the third switch tube is connected in parallel to the third diode, the fourth switch tube is connected in parallel to the fourth diode, the third diode is serially connected to the fourth diode, the negative pole of the first diode is connected to the positive pole of the direct current source, and the positive pole of the second diode is connected to the negative pole of the direct current source.

3. The circuit according to claim 1, wherein
when the positive poles of the fifth and sixth diodes are connected to the negative pole of the direct current source, the negative pole of the fifth diode is connected to the connection point between the second inductor and the alternating current source, and the negative pole of the sixth diode is connected to the connection point between the first inductor and the alternating current source;

when the positive poles of the fifth and sixth diodes are connected to the positive pole of the direct current source, the positive pole of the fifth diode is connected to the connection point between the second inductor and the alternating current source, and the positive pole of the sixth diode is connected to the connection point between the first inductor and the alternating current source.

4. The circuit according to claim 1, further comprising: a first resistor, wherein the first resistor and the first capacitor form a serial circuit, the first resistor is arranged between the first capacitor and the first inductor, and the serial circuit is connected in parallel to the alternating current source.

5. The circuit according to claim 1, further comprising: a third inductor and a fourth inductor, wherein the third inductor is arranged between a connection point between the sixth diode and the alternating current source and the alternating current source; and the fourth inductor is arranged between a connection point between the fifth diode and the alternating current source and the alternating current source.

6. The circuit according to claim 1, further comprising a second capacitor, wherein the second capacitor is connected in parallel to the direct current source, and is configured to perform reactive compensation for the inverter topology circuit.

7. The circuit according to claim 1, further comprising: a seventh diode and an eighth diode, wherein
when the positive poles of the fifth and sixth diodes are connected to the negative pole of the direct current source, the negative poles of the seventh and eighth diodes are connected to the positive pole of the direct current source, the positive pole of the seventh diode is connected to the negative pole of the fifth diode, and the positive pole of the eighth diode is connected to the negative pole of the sixth diode;
when the negative poles of the fifth and sixth diodes are connected to the positive pole of the direct current source, the positive poles of the seventh and eighth diodes are connected to the negative pole of the direct current source, the negative pole of the seventh diode is connected to the positive pole of the fifth diode, and the negative pole of the eighth diode is connected to the positive pole of the sixth diode.

8. The circuit according to claim 1, further comprising: at least two bridge arms, and the bridge arms are connected in parallel.

9. An inverter, comprising:
an inverter topology circuit comprising: a direct current source, an alternating current source, a first bridge arm, a first inductor, and a second inductor, wherein the first bridge arm is connected in parallel to two poles of the direct current source, one ends of the first and second inductors are connected to connection points of two branches of the first bridge arm, respectively, and the other ends of the first and second inductors are connected to two poles of the alternating current source, respectively;
a fifth switch tube, a sixth switch tube, a fifth diode, a sixth diode, and a first capacitor;
a control logic, connected to each switch tube in the inverter topology circuit and configured to control turn-on or turn-off of the switch tubes in the inverter topology circuit; and
a filter circuit, connected to a voltage output end of the inverter topology circuit and configured to filter out interference in an output alternating current voltage,
wherein:
the fifth switch tube is connected in parallel to the fifth diode, and the sixth switch tube is connected in parallel to the sixth diode;
same poles of the fifth and sixth diodes are connected to one pole of the direct current source together, the other pole of the fifth diode is connected to a connection point between the second inductor and the alternating current source, and the other pole of the sixth diode is connected to a connection point between the first inductor and the alternating current source; and
the first capacitor is connected in parallel to two poles of the alternating current source.

10. An inversion method for an inverter circuit, comprising:
within a first half cycle, maintaining a fifth switch tube turned on, and maintaining third, fourth and sixth switch tubes turned off;
turning on a first switch tube, turning off a second switch tube, to increase a current of a first inductor, and output power to an alternating current source;
turning off the first switch tube, to start a freewheeling current by the first inductor, and turning on the second switch tube, to start decreasing by a current of the first inductor;
when the current of the first inductor decreases to zero or a small negative value, turning off the second switch tube and turning on the first switch tube;
within a second half cycle, maintaining the sixth switch tube turned on, and maintaining the first, second and fifth switch tubes turned off;
turning on the third switch tube, turning off the fourth switch tube, to increase a current of a second inductor, and output power to the alternating current source;
turning off the third switch tube, to start a freewheeling current by the second inductor, turning on the fourth switch tube, to decrease the current of the second inductor; and
when the current of the second inductor decreases to zero or a small negative value, turning off the fourth switch tube and turning on the third switch tube.

11. An inversion method, comprising:
in a first time period when an output voltage is reverse to an output current, maintaining first, second, third and fifth switch tubes turned off;
turning on fourth and sixth switch tubes;
maintaining the sixth switch tube turned on, and adjusting time of turning on the fourth switch tube to obtain a desired output current;
in a second time period when the output voltage is reverse to the output current, maintaining the first, third, fourth and sixth switch tubes turned off;
turning on the second and fifth switch tubes; and
maintaining the fifth switch tube turned on, and adjusting time of turning on the second switch tube to obtain a desired output current.

12. An inversion method, comprising:
when first and fifth switch tubes are turned on or turned off concurrently, starting a freewheeling current by a second switch tube, a second diode and a seventh diode concurrently;

when third and sixth switch tubes are turned on or turned off concurrently, starting a freewheeling current by a fourth switch tube, a fourth diode and a eighth diode concurrently;

controlling an inductive current to zero or a negative value, exercising the function of a freewheeling current by the seventh and eight diodes.

13. An inversion method, comprising:

when an output voltage is less than a voltage of a direct current source, working in boost mode by a circuit;

turning on a first switch tube, to increase an inductive current of a first inductor;

turning off the first switch tube, turning on a second switch tube, to start a freewheeling current by the first inductor;

when a voltage of an alternating current source is greater than the voltage of the direct current source, working in buck mode by the circuit;

maintaining the first switch tube turned on, turning on a sixth switch tube, turning off a fifth switch tube, to increase the inductive current of the first inductor; and turning off the sixth switch tube after the current increases, turning on the fifth switch tube, to start a freewheeling current by the first inductor.

* * * * *